(12) United States Patent
Nawhal et al.

(10) Patent No.: US 11,244,202 B2
(45) Date of Patent: Feb. 8, 2022

(54) SYSTEM AND METHOD FOR GENERATION OF UNSEEN COMPOSITE DATA OBJECTS

(71) Applicant: ROYAL BANK OF CANADA, Toronto (CA)

(72) Inventors: Megha Nawhal, Vancouver (CA); Mengyao Zhai, Vancouver (CA); Leonid Sigal, Vancouver (CA); Gregory Mori, Vancouver (CA); Andreas Steffen Michael Lehrmann, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 109 days.

(21) Appl. No.: 16/826,214

(22) Filed: Mar. 21, 2020

(65) Prior Publication Data

US 2020/0302231 A1 Sep. 24, 2020

Related U.S. Application Data

(60) Provisional application No. 62/822,517, filed on Mar. 22, 2019.

(51) Int. Cl.
*G06K 9/62* (2006.01)
*G06N 3/08* (2006.01)

(52) U.S. Cl.
CPC ......... *G06K 9/6256* (2013.01); *G06K 9/6209* (2013.01); *G06K 9/6228* (2013.01); *G06N 3/08* (2013.01)

(58) Field of Classification Search
CPC .. G06K 9/6256; G06K 9/6209; G06K 9/6228; G06N 3/08
See application file for complete search history.

(56) References Cited

U.S. PATENT DOCUMENTS

2019/0304157 A1* 10/2019 Amer .................. G06N 3/0454
2019/0385018 A1* 12/2019 Ngo Dinh ............ G06K 9/6254

OTHER PUBLICATIONS

Kwon, Yong-Hoon, and Min-Gyu Park. "Predicting future frames using retrospective cycle gan." Proceedings of the IEEE/CVF Conference on Computer Vision and Pattern Recognition. 2019. (Year: 2019).*

(Continued)

*Primary Examiner* — Fayyaz Alam
(74) *Attorney, Agent, or Firm* — Norton Rose Fulbright Canada LLP

(57) ABSTRACT

A computer implemented system for generating one or more data structures is described, the one or more data structures representing an unseen composition based on a first category and a second category observed individually in a training data set. During training of a generator, a proposed framework utilizes at least one of the following discriminators—three pixel-centric discriminators, namely, frame discriminator, gradient discriminator, video discriminator; and one object-centric relational discriminator. The three pixel-centric discriminators ensure spatial and temporal consistency across the frames, and the relational discriminator leverages spatio-temporal scene graphs to reason over the object layouts in videos ensuring the right interactions among objects.

20 Claims, 12 Drawing Sheets

(56) References Cited

OTHER PUBLICATIONS

C. Hardy, E. Le Merrer and B. Sericola, "MD-GAN: Multi-Discriminator Generative Adversarial Networks for Distributed Datasets," 2019 IEEE International Parallel and Distributed Processing Symposium (IPDPS), 2019, pp. 866-877, doi: 10.1109/IPDPS.2019.00095. (Year: 2019).*
N. Ronquillo and J. Harguess, "On Evaluating Video-based Generative Adversarial Networks (GANs)," 2018 IEEE Applied Imagery Pattern Recognition Workshop (AIPR), 2018, pp. 1-7, doi: 10.1109/AIPR.2018.8707431. (Year: 2018).*
M. Arjovsky, S. Chintala, and L. Bottou. Wasserstein generative adversarial networks. In International Conference on Machine Learning, pp. 214-223, 2017. 3.
P. Isola, J.-Y. Zhu, T. Zhou, and A. A. Efros. Image-to-image translation with conditional adversarial networks. In 2017 IEEE Conference on Computer Vision and Pattern Recognition (CVPR), pp. 5967-5976. IEEE, 2017. 1, 3.
N. Kalchbrenner, A. van den Oord, K. Simonyan, I. Danihelka, O. Vinyals, A. Graves, and K. Kavukcuoglu. Video pixel networks. In Proceedings of the 34th International Conference on Machine Learning—vol. 70, pp. 1771-1779. JMLR. org, 2017. 3.
R. Krishna, Y. Zhu, O. Groth, J. Johnson, K. Hata, J. Kravitz, S. Chen, Y. Kalantidis, L.-J. Li, D. A. Shamma, et al. Visual genome: Connecting language and vision using crowdsourced dense image annotations. International Journal of Computer Vision, 123(1):32-73, 2017. 2.
L. Stark and K. Bowyer. Achieving generalized object recognition through reasoning about association of function to structure. IEEE Transactions on Pattern Analysis and Machine Intelligence, 13(10):1097-1104, 1991. 2.
A. Odena, C. Olah, and J. Shlens. Conditional image synthesis with auxiliary classifier gans. In Proceedings of the 34th International Conference on Machine Learning—vol. 70, pp. 2642-2651. JMLR. org, 2017. 3.
A. Radford, L. Metz, and S. Chintala. Unsupervised representation learning with deep convolutional generative adversarial networks. arXiv preprint arXiv:1511.06434, 2015. 1, 3, 4, 9.
S. Reed, Z. Akata, X. Yan, L. Logeswaran, B. Schiele, and H. Lee. Generative adversarial text to image synthesis. arXiv preprint arXiv:1605.05396, 2016. 3.
D. J. Rezende, S. Mohamed, and D. Wierstra. Stochastic backpropagation and variational inference in deep latent gaussian models. In International Conference on Machine Learning, vol. 2, 2014. 3.
M. Saito, E. Matsumoto, and S. Saito. Temporal generative adversarial nets with singular value clipping. In IEEE International Conference on Computer Vision (ICCV), vol. 2, p. 5, 2017. 1, 3, 9.
T. Salimans, I. Goodfellow, W. Zaremba, V. Cheung, A. Radford, and X. Chen. Improved techniques for training gans. In Advances in neural information processing systems, pp. 2234-2242, 2016. 9.
L. Shen, S. Yeung, J. Hoffman, G. Mori, and L. Fei-Fei. Scaling human-object interaction recognition through zero-shot learning. In 2018 IEEE Winter Conference on Applications of Computer Vision (WACV), pp. 1568-1576. IEEE, 2018. 3.
Y. Shen, F. Lu, X. Cao, and H. Foroosh. Video completion for perspective camera under constrained motion. In 18th International Conference on Pattern Recognition, pp. 63-66. IEEE, 2006. 3.
G. A. Sigurdsson, O. Russakovsky, and A. Gupta. What actions are needed for understanding human actions in videos? In Computer Vision (ICCV), 2017 IEEE International Conference on, pp. 2156-2165. IEEE, 2017. 3.
G. A. Sigurdsson, G. Varol, X. Wang, A. Farhadi, I. Laptev, and A. Gupta. Hollywood in homes: Crowdsourcing data collection for activity understanding. In European Conference on Computer Vision, 2016. 1.
N. Srivastava, E. Mansimov, and R. Salakhudinov. Unsupervised learning of video representations using lstms. In International conference on Machine Learning, pp. 843-852, 2015. 3.
X. Sun, R. Szeto, and J. J. Corso. A temporally-aware interpolation network for video frame inpainting. arXiv preprint arXiv:1803.07218, 2018. 4.
S. Tulyakov, M.-Y. Liu, X. Yang, and J. Kautz. Mocogan: Decomposing motion and content for video generation. In Proceedings of the IEEE conference on computer vision and pattern recognition, pp. 1526-1535, 2018. 3.
A. van den Oord, N. Kalchbrenner, L. Espeholt, O. Vinyals, A. Graves, et al. Conditional image generation with pixelcnn decoders. In Advances in Neural Information Processing Systems, pp. 4790-4798, 2016. 1, 3.
C. Vondrick, H. Pirsiavash, and A. Torralba. Anticipating visual representations from unlabeled video. In Proceedings of the IEEE Conference on Computer Vision and Pattern Recognition, pp. 98-106, 2016. 9.
C. Vondrick, H. Pirsiavash, and A. Torralba. Generating videos with scene dynamics. In Advances in Neural Information Processing Systems, pp. 613-621, 2016. 1, 3, 9.
J. Walker, C. Doersch, A. Gupta, and M. Hebert. An uncertain future: Forecasting from static images using variational autoencoders. In European Conference on Computer Vision, pp. 835-851. Springer, 2016. 3.
J. Walker, K. Marino, A. Gupta, and M. Hebert. The pose knows: Video forecasting by generating pose futures. In Computer Vision (ICCV), 2017 IEEE International Conference on, pp. 3352-3361. IEEE, 2017. 3.
Q. Wang and K. Chen. Alternative semantic representations for zero-shot human action recognition. In Joint European Conference on Machine Learning and Knowledge Discovery in Databases, pp. 87-102. Springer, 2017. 3.
M. Werlberger, T. Pock, M. Unger, and H. Bischof. Optical flow guided tv-l 1 video interpolation and restoration. In International Workshop on Energy Minimization Methods in Computer Vision and Pattern Recognition, pp. 273-286. Springer, 2011. 4.
Y. Wexler, E. Shechtman, and M. Irani. Space-time video completion. In Transactions on Pattern Analysis and Machine Intelligence, pp. 120-127. IEEE, 2004. 3.
T. Xu, P. Zhang, Q. Huang, H. Zhang, Z. Gan, X. Huang, and X. He. Attngan: Fine-grained text to image generation with attentional generative adversarial networks. In Proceedings of the IEEE Conference on Computer Vision and Pattern Recognition, pp. 1316-1324, 2018. 3.
X. Xu, T. Hospedales, and S. Gong. Semantic embedding space for zero-shot action recognition. In Image Processing (ICIP), 2015 IEEE International Conference on, pp. 63-67. IEEE, 2015. 3.
T. Xue, J. Wu, K. Bouman, and B. Freeman. Visual dynamics: Probabilistic future frame synthesis via cross convolutional networks. In Advances in Neural Information Processing Systems, pp. 91-99, 2016. 3.
T. Xue, J. Wu, K. L. Bouman, and W. T. Freeman. Visual dynamics: Stochastic future generation via layered cross convolutional networks. In IEEE Transactions on Pattern Analysis and Machine Intelligence (TPAMI), 2018. 3.
B. Yao and L. Fei-Fei. Modeling mutual context of object and human pose in human-object interaction activities. In Computer Vision and Pattern Recognition (CVPR), 2010 IEEE Conference on, pp. 17-24. IEEE, 2010. 2.
R. Zellers, M. Yatskar, S. Thomson, and Y. Choi. Neural motifs: Scene graph parsing with global context. In Proceedings of the IEEE Conference on Computer Vision and Pattern Recognition, pp. 5831-5840, 2018. 2.
H. Zhang, T. Xu, H. Li, S. Zhang, X. Wang, X. Huang, and D. N. Metaxas. Stackgan: Text to photo-realistic image synthesis with stacked generative adversarial networks. In Proceedings of the IEEE International Conference on Computer Vision, pp. 5907-5915, 2017. 1, 3.
J.-Y. Zhu, T. Park, P. Isola, and A. A. Efros. Unpaired image-to-image translation using cycle-consistent adversarial networks. arXiv preprint, 2017. 3.
A. Bansal, S. Ma, D. Ramanan, and Y. Sheikh. Recycle-gan: Unsupervised video retargeting. In Proceedings of the European Conference on Computer Vision (ECCV), pp. 119-135, 2018. 1.

(56) References Cited

OTHER PUBLICATIONS

L. Bottou, J. Peters, J. Quiñonero-Candela, D. X. Charles, D. M. Chickering, E. Portugaly, D. Ray, P. Simard, and E. Snelson. Counterfactual reasoning and learning systems. arXiv preprint arXiv:1209.2355, 2012. 1.

A. Brock, J. Donahue, and K. Simonyan. Large scale gan training for high fidelity natural image synthesis. arXiv preprint arXiv:1809.11096, 2018. 1.

Y.-W. Chao, Y. Liu, X. Liu, H. Zeng, and J. Deng. Learning to detect human-object interactions. In 2018 IEEE Winter Conferenceon Applications of Computer Vision (WACV), pp. 381-389. IEEE, 2018. 2.

Y.-W. Chao, Z. Wang, Y. He, J. Wang, and J. Deng. Hico: A benchmark for recognizing human-object interactions in images. In Proceedings of the IEEE International Conference on Computer Vision, pp. 1017-1025, 2015. 2.

X. Chen, Y. Duan, R. Houthooft, J. Schulman, I. Sutskever, and P. Abbeel. Infogan: Interpretable representation learning by information maximizing generative adversarial nets. In Advances in neural information processing systems, pp. 2172-2180, 2016. 3.

V. Delaitre, D. F. Fouhey, I. Laptev, J. Sivic, A. Gupta, and A. A. Efros. Scene semantics from long-term observation of people. In European conference on computer vision, pp. 284-298. Springer, 2012. 2.

E. L. Denton, S. Chintala, R. Fergus, et al. Deep generative image models using a laplacian pyramid of adversarial networks. In Advances in neural information processing systems, pp. 1486-1494, 2015. 3.

E. L. Denton et al. Unsupervised learning of disentangled representations from video. In Advances in Neural Information Processing Systems, pp. 4414-4423, 2017. 3.

C. Desai and D. Ramanan. Detecting actions, poses, and objects with relational phraselets. In European Conference on Computer Vision, pp. 158-172. Springer, 2012. 2.

M. Ebdelli, O. Le Meur, and C. Guillemot. Video inpainting with short-term windows: application to object removal and error concealment. IEEE Transactions on Image Processing, 24(10):3034-3047, 2015. 3.

B. G. Fabian Caba Heilbron, Victor Escorcia and J. C. Niebles. Activitynet: A large-scale video benchmark for human activity understanding. In Proceedings of the IEEE Conference on Computer Vision and Pattern Recognition, pp. 961-970, 2015. 1.

C. Finn, I. Goodfellow, and S. Levine. Unsupervised learning for physical interaction through video prediction. In Advances in neural information processing systems, pp. 64-72, 2016. 3.

D. F. Fouhey, V. Delaitre, A. Gupta, A. A. Efros, I. Laptev, and J. Sivic. People watching: Human actions as a cue for single view geometry. International journal of computer vision, 110(3):259-274, 2014. 2.

Y. Fu, T. M. Hospedales, T. Xiang, Z. Fu, and S. Gong. Transductive multi-view embedding for zero-shot recognition and annotation. In European Conference on Computer Vision, pp. 584 599. Springer, 2014. 3.

C. Gan, T. Yang, and B. Gong. Learning attributes equals multi-source domain generalization. In Proceedings of the IEEE Conference on Computer Vision and Pattern Recognition, pp. 87-97, 2016. 3.

G. Gkioxari, R. Girshick, P. Doll'ar, and K. He. Detecting and recognizing human-object interactions. arXiv preprint arXiv:1704.07333, 2017. 3.

I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014. 3, 4.

H. Grabner, J. Gall, and L. Van Gool. What makes a chair a chair? In Computer Vision and Pattern Recognition (CVPR), 2011 IEEE Conference on, pp. 1529-1536. IEEE, 2011. 2.

M. Granados, K. I. Kim, J. Tompkin, J. Kautz, and C. Theobalt. Background inpainting for videos with dynamic objects and a free-moving camera. In European Conference on Computer Vision, pp. 682-695. Springer, 2012. 3.

S. Guadarrama, N. Krishnamoorthy, G. Malkarnenkar, S. Venugopalan, R. Mooney, T. Darrell, and K. Saenko. Youtube2text: Recognizing and describing arbitrary activities using semantic hierarchies and zero-shot recognition. In Proceedings of the IEEE international conference on computer vision, pp. 2712-2719, 2013. 3.

A. Gupta and L. S. Davis. Objects in action: An approach for combining action understanding and object perception. In Computer Vision and Pattern Recognition, 2007. CVPR'07. IEEE Conference on, pp. 1-8. IEEE, 2007. 2.

J. He, A. Lehrmann, J. Marino, G. Mori, and L. Sigal. Probabilistic video generation using holistic attribute control. In Proceedings of the European Conference on Computer Vision (ECCV), pp. 452-467, 2018. 1.

S. Ioffe and C. Szegedy. Batch normalization: Accelerating deep network training by reducing internal covariate shift. In F. Bach and D. Blei, editors, Proceedings of the 32nd International Conference on Machine Learning, vol. 37 of Proceedings of Machine Learning Research, pp. 448-456, Lille, France, Jul. 7-9, 2015. PMLR. 5, 6.

M. Jain, J. C. van Gemert, T. Mensink, and C. G. Snoek. Objects2action: Classifying and localizing actions without any video example. In Proceedings of the IEEE international conference on computer vision, pp. 4588-4596, 2015. 3.

J. Jia, W. Tai-Pang, Y.-W. Tai, and C.-K. Tang. Video repairing: Inference of foreground and background under severe occlusion. In Computer Vision and Pattern Recognition, 2004. CVPR 2004. Proceedings of the 2004 IEEE Computer Society Conference on, vol. 1, pp. I-I. IEEE, 2004. 3.

Y.-T. Jia, S.-M. Hu, and R. R. Martin. Video completion using tracking and fragment merging. The Visual Computer, 21 (8-10):601-610, 2005. 3.

V. Kalogeiton, P. Weinzaepfel, V. Ferrari, and C. Schmid. Joint learning of object and action detectors. In 2017 IEEE International Conference on Computer Vision (ICCV), pp. 2001-2010. IEEE, 2017. 3.

T. Karras, T. Aila, S. Laine, and J. Lehtinen. Progressive growing of gans for improved quality, stability, and variation. arXiv preprint arXiv:1710.10196, 2017. 1, 3.

K. Kato, Y. Li, and A. Gupta. Compositional learning for human object interaction. In Computer Vision—ECCV 2018, pp. 247-264. Springer, 2018. 3.

T. Kim, M. Cha, H. Kim, J. K. Lee, and J. Kim. Learning to discover cross-domain relations with generative adversarial networks. arXiv preprint arXiv:1703.05192, 2017. 3.

D. P. Kingma and M. Welling. Stochastic gradient vb and the variational auto-encoder. In Second International Conference on Learning Representations, ICLR, 2014. 3.

H. Kjellström, J. Romero, and D. Kragić. Visual object-action recognition: Inferring object affordances from human demonstration. Computer Vision and Image Understanding, 115(1):81-90, 2011. 2.

A. X. Lee, R. Zhang, F. Ebert, P. Abbeel, C. Finn, and S. Levine. Stochastic adversarial video prediction. arXiv preprint arXiv:1804.01523, 2018. 3.

X. Liang, L. Lee, W. Dai, and E. P. Xing. Dual motion gan for future-flow embedded video prediction. In 2017 IEEE International Conference on Computer Vision (ICCV), pp. 1762-1770. IEEE, 2017. 3.

J. Liu, B. Kuipers, and S. Savarese. Recognizing human actions by attributes. In Computer Vision and Pattern Recognition (CVPR), 2011 IEEE Conference on, pp. 3337-3344. IEEE, 2011. 3.

M.-Y. Liu, T. Breuel, and J. Kautz. Unsupervised image-to-image translation networks. In Advances in Neural Information Processing Systems, pp. 700-708, 2017. 3.

Z. Liu, R. A. Yeh, X. Tang, Y. Liu, and A. Agarwala. Video frame synthesis using deep voxel flow. In Proceedings of the IEEE International Conference on Computer Vision, pp. 4463-4471, 2017. 4.

(56) References Cited

OTHER PUBLICATIONS

Y. Long and L. Shao. Learning to recognise unseen classes by a few similes. In Proceedings of the 2017 ACM on Multimedia Conference, pp. 636-644. ACM, 2017. 3.

A. L. Maas, A. Y. Hannun, and A. Y. Ng. Rectifier nonlinearities improve neural network acoustic models. In Proc. icml, vol. 30, p. 3, 2013. 5.

X. Mao, Q. Li, H. Xie, R. Y. Lau, Z. Wang, and S. Paul Smolley. Least squares generative adversarial networks. In Proceedings of the IEEE International Conference on Computer Vision, pp. 2794-2802, 2017. 3.

M. Mathieu, C. Couprie, and Y. LeCun. Deep multi-scale video prediction beyond mean square error. International Conference on Learning Representations, 2016. 3.

P. Mettes and C. G. Snoek. Spatial-aware object embeddings for zero-shot localization and classification of actions. In Proceedings of the International Conference on Computer Vision, 2017. 3.

M. Mirza and S. Osindero. Conditional generative adversarial nets. arXiv preprint arXiv:1411.1784, 2014. 4.

T. Miyato and M. Koyama. cgans with projection discriminator. arXiv preprint arXiv:1802.05637, 2018. 3.

A. Newson, A. Almansa, M. Fradet, Y. Gousseau, and P. P'erez. Video inpainting of complex scenes. SIAM Journal on Imaging Sciences, 7(4):1993-2019, 2014. 3.

S. Niklaus, L. Mai, and F. Liu. Video frame interpolation via adaptive separable convolution. arXiv preprint arXiv:1708.01692, 2017. 4.

* cited by examiner

400A

Training Video 1: "Wash Aubergine"

Wash ~= rinse, apply liquid, water

Aubergine ~= vegetable / fruit / berry, purple, nightshade family

Training Video 2: "Put Tomato"

Put ~= move, place, translate, position

Tomato ~= vegetable / fruit / berry, red, nightshade family, small

Target Unseen Composition: "Wash Tomato"

Generate video based on training sequences

Training Transaction Sequence 1: "Michael, no children"

Michael ~= hipster, age 25, shops at beard care shops, independent coffee shops, rents residence No children ~= disposable income, recreational activities Training Transaction Sequence 1: "Greg, has two children"

Greg ~= financially independent, age 30, owns residence, shops at wholesale stores, is clean shaven Has children ~= less disposable income, children-focused activities

Target Unseen Composition: "Michael, has two children"

Generate vector representation based on training sequences

| Ours / Baseline | GS1 | GS2 |
|---|---|---|
| HOI-GAN / MoCoGAN | 71.7/28.3 | 69.2/30.8 |
| HOI-GAN / C-TGAN | 75.4/34.9 | 79.3/30.7 |
| HOI-GAN / C-VGAN | 83.6/16.4 | 80.4/19.6 |

SYSTEM AND METHOD FOR GENERATION OF UNSEEN COMPOSITE DATA OBJECTS

CROSS-REFERENCE

This application is a non-provisional of, and claims all benefit, including priority, of U.S. Application No. 62/822,517, filed 22 Mar. 2019, entitled "SYSTEM AND METHOD FOR GENERATION OF UNSEEN COMPOSITE DATA OBJECTS", incorporated herein by reference in its entirety.

INTRODUCTION

Recent successes in the field of image and video generation using generative models are promising. Visual imagination and prediction are components of human intelligence. Arguably, the ability to create realistic renderings from symbolic representations are considered prerequisite for broad visual understanding.

While most approaches focus on the expressivity and controllability of the underlying generative models, their ability to adapt (e.g., generalize) to unseen scene compositions has not received as much attention. However, such ability to adapt is an important cornerstone of robust visual imagination as it demonstrates the capacity to reason over elements of a scene.

Existing models are capable of generating realistic static images in various domains ranging from simple characters to real-world images. However, the video generation models are constrained to simpler settings.

As such, they contain single objects, they involve simple translational motion with no or minimal background. Generating task-oriented realistic videos is a natural next challenge in the field of video generation.

With the availability of large scale datasets, human activity videos have gained attraction in the field of Computer Vision and are considered to be a good example of realistic videos. The key to understand these videos is to equip the automated algorithms with an understanding of how humans interact with various objects in the world.

As a result, there has been a shift from action understanding to activity understanding involving actions and actions being performed on these objects (e.g., put spoon, open microwave, cut tomato). Prior research suggests that generative adversarial networks (GANs) can generate pixel level information in images or videos in realistic scenarios.

Related Work

Modeling Human-Object Interactions. Understanding of human-object interactions (HOIs) has a history in the field of computer vision. Earlier research attempts aimed at studying object affordances and semantic-driven understanding of object functionalities. Recent work on modeling HOIs in images range from studying semantics and spatial features of interactions between humans and objects to action information. Furthermore, there have been attempts to create large scale image datasets for HOIs. However, image datasets cannot incorporate the dynamics of interactions with objects in videos which is a more realistic setting.

One of the largest HOI video datasets released recently is Dataset 2 which comprises of 20,000 videos. Nonetheless, even such relatively large datasets would involve a small subset of objects that humans interact with in everyday lives.

Zero-shot action recognition. Alternate approaches on zero-shot action recognition have been conducted in past few years. These methods include using attribute-based information, word embeddings, visual-semantic embeddings extracted from pretrained deep networks or text-based descriptions for zero-shot classification. Jain et al. proposed object classifier for zero shot action recognition. Kalogeition et al. and Kato et al. proposed to jointly detect objects and actions in videos. Zero-shot recognition frameworks has also been explored for recognizing zero-shot human-object interactions.

Generative Adversarial Networks. Generative Adversarial Networks (GANs) comprise of two networks, namely, generator and discriminator involving a zero-sum game between two networks during training.

The generator network synthesizes data in a manner that the discriminator is unable to differentiate between the real and generated data. In addition to noise as the only input to the generator (also referred to as unconditional generation), conditional models are used for generating data using various forms of inputs to the generator such as textual information, category labels, and images. These conditional models belong to the category of conditional GANs.

GAN-based Video/Image Generation. Several deep generative networks including GANs, Variational Autoencoders (VAEs) and PixelCNNs have been proposed for image generation. Recent variants of GAN-based image generation framework have shown remarkable performance. Denton et al. proposed a Laplacian pyramid based GAN to improve the quality of images. Radford et al. presented a deeper convolutional network for GAN called Deep Convolution GAN (DCGAN). Auxiliary Classifier GANs (AC-GANs) employ a cost function for classification to synthesize diverse images conditioned on class labels. Zhang et al. presented a two-stage GAN framework conditioned on text descriptions of images. InfoGAN aimed at learning interpretable latent space for generation process. However, training instability in GANs makes it difficult to generate high resolution images and models such as WGAN and LSGAN. Karras et al. used progressive growing of the discriminator and the generator to generate high resolution images.

Extending existing generative modeling efforts (both GANs and VAEs) to videos is not straightforward since generating a video would involve modeling of both spatial and temporal variations. Vondrick et al. proposed 3D convolutions based two-stream generator network disentangling foreground and background of the scenes. Temporal GANs use multiple generators including 1D convolution network for modeling temporal variations and 2D convolution based network to generate images. MoCoGAN disentangle the latent space representations into motion and content to perform more controlled video generation. These video generation frameworks are primarily designed for unconditional generation, which is different than embodiments described herein.

Video Prediction. Existing video prediction methods predict future frames of a video given some observed frames using recurrent networks, variational encoders, adversarial training or autoregressive methods. Most of these approaches are trained to minimize reconstruction losses and essentially average over all possible futures leading to blurry frame predictions.

To address this issue, several approaches employ stochastic methods to predict future frames of a video. While these models predict future frames, they models have limited accuracy in the case of long duration sequences that possess high spatio-temporal variability. As described in some embodiments herein, although an approach conditions the generation of the video on an observed frame, the problem is substantially different since the input frame is used to provide background information to the networks during video generation instead of predicting few future frames.

Video Inpainting. Given a video with arbitrary spatio-temporal pixels missing, video inpainting refers to the problem of filling up the missing pixels correctly. While some methods are based on procuring the optimal patch for the missing area in the videos, other methods identify foreground and background of the video frames and repair each of the frames separately. Stochastic methods determine the value of missing pixels based on likelihood maximization using a probabilistic model. Many of these approaches rely on assumptions about the video content such as static background.

Additionally, these methods are designed for cases in which the missing areas are small and have limited capacity when the video has a full frame or a sequence of frames is missing. For inpainting a full frame, various interpolation networks have been proposed interpolate the frames between the given observed frames in the video sequence. However, these methods are heavily driven by the spatio-temporal content of the given video (with missing frames/regions). In contrast, some embodiments described herein focuses on generating a sequence of frames based on the descriptions and the background context of a scene.

SUMMARY

An approach for machine learning using a proposed data model architecture is described, the approach directed to a machine learning generator network that is trained using a plurality of difference discriminator networks. The generator network and the difference discriminator networks can be neural networks, for example. The generator network is a generative multi-adversarial network, and can be used, for example, in "zero-shot" situations to generate outputs where the machine learning approach has a sparsity of (e.g., little or no) labelled training data in respect of a particular task.

An example "zero shot" situation described in some non-limiting example embodiments herein relates to generation of unseen composite data objects in a video for a particular sequence pair which has never been encountered in training (or encountered only a few times).

An example sequence pair, can include an action/physical article pair, such as "cut tomato", and the combination of "cut tomato" has not been seen before in training videos. Applicants posit that the domain of human activities constitutes a rich realistic testbed for video generation models. Human activities involve people interacting with physical articles in complex ways, presenting numerous challenges for generation—the need to (1) render a variety of physical articles; (2) model the temporal evolution of the effect of actions on physical articles; (3) understand spatial relations and interactions; and (4) overcome the paucity of data for the complete set of action-physical article pairings. The last, in particular, is a critical challenge that also serves as an opportunity for designing and evaluating generative models that can generalize to myriad, possibly unseen, action-physical article compositions.

The learnings from video generation can also be extended to other domains relating to time series-based data, for example, and noted in alternate embodiments. The approach is adapted to advance the technology on conditional (or controllable) composite object generation (e.g., video generation) and focus on the model's ability to generalize to unseen compositions (e.g., action-object pairs). This zero-shot compositional setting verifies that the model is capable of semantic disentanglement of the action and objects in a given context and recreating them separately in other contexts. Other domains can include, for example, stock market based examples wherein time series data can be packaged as "frames" of events at various time slices, and analyzed similarly. Another non-video example can include the analysis of transaction data, where the generator is tasked with generating a simulated time-series data object representative of a simulated user's transaction records (e.g., Greg purchases 1 L of 2% milk for $3.99 at the corner store on Monday morning, then he buys a newspaper for $2.50 at the newspaper stand nearby). Another example can include stock market movements, where the time series data can include, for example, stock price movements as well as event/company data, and the outputs can be automatically generated (e.g., hallucinated) estimates of future stock market activity.

Accordingly, the system can be tasked with generating frames of time series data (e.g., video frames) representative of a desired composition (e.g., "cut tomato") despite this being an unseen composition, and may be able to estimate from a trained network that may have been trained (e.g., observed) with somewhat similar compositions (e.g., videos of "squashing" of "eggplants") or aspects of a sequence pair individually (e.g., videos of "cutting", and videos of "tomatoes"). The frames resultant from the generation can represent an attempted estimate resultant from the trained model, such as generating a video of a tomato being cut having the insides that are based on some modification of the insides of an eggplant.

The approach is validated on the generation of human activity videos, as these approaches involve rich, varied interactions between people and objects. Video generation in complex scenes is an open problem, and this approach can then be adapted for uses beyond uses in respect of videos, such as generating new data objects in a zero-shot compositional setting, i.e., generating data structures (e.g., videos) for data object (e.g., action-object) compositions that are unseen during training, having seen the target action and target object separately. The steps taken during validation, as noted above, indicate that the approach works and is extensible beyond the application of videos.

The zero-shot setting is particularly important for adaptation in data object (e.g., human activity video) generation, obviating the need to observe every possible characteristic (e.g., action-object) combination in training and thus avoiding the combinatorial explosion involved in modeling complex scenes. Training costs can thus be lowered and less cycles are required for training, which is useful where there is limited computational power, storage, or time available for training.

The embodiments are not limited to human object interaction (HOI) action/object sequence pairs, and can include other types of zero-shot tasks where there may be different types of data objects, such as characteristic-characteristic pairs, n-tuples, among others. For example, the data objects desired to be generated can include, for example, a new type of customer data for a user profile data structure based on characteristic combinations that were not present in the training set.

Training for unseen compositions is an important technical problem to be solved in machine learning, as there will not always be training data that covers a particular composition. This problem is compounded as the number of possible dimensions for a composition increases (e.g., "wash" "eggplant" in "kitchen" during "afternoon"), or where training data is expensive to generate or obtain.

Accordingly, the unseen composition approach described herein can be used to generate a new composite object (e.g., a fixed length video clip) given a set of desired characteristics (e.g., an action, an object, and a target scene serving as the context).

Another important consideration is where the machine learning approach is to be used in deliberately unseen compositions, for example, where existing customer data is being utilized to generate never before seen compositions of customers of customer data to create simulated customer data (e.g., which can be created to preserve the privacy of the original customers such that the original customer data can be deleted or protected after use in simulated customer data generation). This composition is deliberately an unseen combination as it is a simulated "fake" customer, whereby no personal information of a particular actual customer can be regenerated. Similarly, unseen compositions are useful in stock market analysis as the price of various equities (or fixed income) can be simulated for a future period of time where there is an unseen composition of events or characteristics that can be set for the simulation (e.g., setting an event that a company finds a large gold deposit in one of their mining claims such that the action-object pair analog would be GoldCompanyX|finding large gold deposit in California on 2025 May 5).

To generate these data objects (e.g., human-physical article interaction videos or simulated transaction data), there is described a novel adversarial framework (in some embodiments relating to video referred to as HOI-GAN) which includes multiple discriminators focusing on different aspects of a video. To demonstrate the effectiveness of the proposed framework, Applicants have performed extensive quantitative and qualitative evaluation on two challenging video datasets.

The desiderata for performing zero-shot object (e.g., HOI video) generation include: (1) mapping the content to the right semantic category, (2) ensuring consistency (e.g., spatial and temporal) across the frames, and (3) producing output data structures (e.g., interactions) representative of the right physical article in the presence of multiple physical articles. Based on these observations, a novel multi-adversarial learning mechanism involving multiple discriminators is proposed, each focusing on different aspects of the desired output (e.g., HOI video).

In an aspect, conditional GANs using spatio-temporal visual information and semantic labels describing a sequence of events is provided. In particular, systems and methods for generation of unseen composite data objects that uses GANs to perform inference when provided with conditions that are unseen during the training process.

Data objects can include various types of data structures, and while for illustrative purposes, the data objects described in many embodiments include video data, the data objects include various types of sequential data, and generation of unseen types of sequential data. For example, sequential data can include time series data.

Generating new composite data objects that representing an unseen composition is technically challenging for a machine learning system. The approach requires discrimination between competing machine learning considerations, and specific machine learning-based computational techniques are described herein.

Applicants have tested variations of the machine learning-based computational techniques and present experimental results in accordance with two different data sets, where the composite data objects are video composites based on underlying training videos and associated labels. Videos are a non-limiting example of a composite data object, and other types of composite data objects are possible. Composite data objects can include non-graphical data objects, such as data structures adapted for downstream processing and inference/relationship insight generation.

In an aspect, a computer implemented method of generating one or more data structures using a conditional generative adversarial network, the one or more data structures representing an unseen composition based on a first category and a second category observed individually, is provided.

The method includes: receiving a training data set including labelled data elements based on the first category and labelled data elements based on the second category; receiving a target category indication representative of the unseen composition; processing the training data set to train a discriminator model architecture coupled to a generator model architecture, the discriminator model architecture having a plurality of adversarial networks operating in concert to train the generator model architecture.

The discriminator model architecture includes providing a sequence discriminator configured to distinguish between a real sequence and a generated sequence; a frame discriminator configured to differentiate between frames representing sequence subsets of the real sequence and the generated sequence; a gradient discriminator configured to differentiate between a domain-specific gradient determined based on the type of data structure of the one or more data structures and the training data set; and a foreground discriminator configured to assign weights for shifting focus of the generator model architecture to a subset of the one or more new data structures based on an identified context associated with the target category indication of the unseen composition. The generator model architecture generates the one or more data structures.

In another aspect, the first category includes a set of actions, the second category includes a set of physical articles, and the training data set includes a plurality of data structures of action/physical article pairs different than the target category indication representative of the unseen composition.

In another aspect, the new data structures includes at least a new video data structure generated to represent an action/physical article pair representative of the unseen composition by synthesizing independently observed data represented in the training data set.

In another aspect, the first category includes vectorized transactional information and wherein the second category includes vectorized representation of one or more events.

In another aspect, vectorized labels associated with each training data element in the training data set are processed to identify one or more contextual components that are used for comparison with a vector representing the unseen composition, the one or more contextual components utilized for modifying the operation of the discriminator model architecture.

In another aspect, the video discriminator utilizes a loss function having the relation:

$$L_v = \tfrac{1}{2}[\log(D_v(V_{real}, s_a, s_o)) + \log(1 - D_v(V_{gen}, s_a, s_o))].$$

In another aspect, the frame discriminator utilizes a loss function having the relation:

$$L_f = \frac{1}{2T} \sum_{i=1}^{T} [\log(D_f^i(V_{real}, s_a, s_o)) + \log(1 - D_f^i(V_{gen}, s_a, s_o))].$$

In another aspect, the gradient discriminator utilizes a loss function having the relation:

$$L_g = \frac{1}{2(T-1)} \sum_{i=1}^{T-1} [\log(D_g^i(\delta V_{real}, s_a, s_o)) + \log(1 - D_g^i(\delta V_{gen}, s_a, s_o))].$$

In another aspect, the foreground discriminator utilizes a loss function having the relation:

$$L_{fg} = \frac{1}{2T} \sum_{i=1}^{T} [\log(D_{fg}^i(F_{real}, s_a, s_o)) + \log(1 - D_{fg}^i(F_{gen}, s_a, s_o))].$$

In another aspect, the generator model architecture is configured to be optimized using an objective function having the relation:

$$\mathcal{L}_{gan} = \log(1 - D_V(V_{gen}, s_a, s_o)) + \frac{1}{T} \sum_{i=1}^{T} [\log(1 - D_f^i(V_{gen}, s_a, s_o))] +$$

$$\frac{1}{(T-1)} \sum_{i=1}^{T-1} [\log(1 - D_g^i(\delta V_{gen}, s_a, s_o))] +$$

$$\frac{1}{T} \sum_{i=1}^{T} [\log(1 - D_{fg}^i(F_{gen}, s_a, s_o))].$$

In another aspect, a computer implemented method of generating one or more data structures using a conditional generative adversarial network, the one or more data structures representing an unseen composition based on a first category and a second category observed individually is provided.

The method includes receiving a training data set including labelled data elements based on the first category and labelled data elements based on the second category; and then receiving a target category indication representative of the unseen composition.

The training data set is processed to train a discriminator model architecture coupled to a generator model architecture, the discriminator model architecture including at least: a relational discriminator configured to assign weights for shifting focus of the generator model architecture to a subset of the one or more new data structures based on an identified context associated with the target category indication of the unseen composition.

The one or more data structures are generated using the generator model architecture. The relational discriminator utilizes a spatio-temporal scene graph, and learns to distinguish between element layouts of real data objects $V_{real}$ and generated data objects $V_{gen}$, and the spatio-temporal scene graph is represented as $\mathcal{S} = (\mathcal{N}, \varepsilon)$ and generated from V, where the nodes and edges are represented by $\mathcal{N}$ and $\varepsilon$.

In another aspect, the relational discriminator operates on scene graph $\mathcal{S}$ using a graph convolutional network (GCN) followed by stacking and average-pooling of the resulting node representations along the time axis.

In another aspect, the scene graph is the concatenated with spatially replicated copies of $s_a$ and $s_o$ to generate a tensor of size $(\dim(s_a) + \dim(s_o) + N^{(t)}) \times w_0^{(t)} \times h_0^{(t)}$.

In another aspect, the method further comprising applying convolutions and sigmoid to the tensor of size $(\dim(s_a) + \dim(s_o) + N^{(t)}) \times w_0^{(t)} \times h_0^{(t)}$ to obtain an intermediate output which denotes the probability of the scene graph belonging to a real data object, the intermediate output used to assign the weights for shifting focus of the generator model architecture.

In another aspect, an objective function of the relational discriminator is given by:

$$L_r = \frac{1}{2}[\log(D_r(\mathcal{S}_{real}; s_a, s_o)) + \log(1 - D_r(\mathcal{S}_{gen}; s_a, s_o))].$$

In another aspect, the discriminator model architecture further includes a sequence discriminator configured to distinguish between a real sequence and a generated sequence.

In another aspect, the discriminator model architecture further includes a gradient discriminator configured to differentiate between a domain-specific gradient determined based on the type of data structure of the one or more data structures and the training data set.

In another aspect, the discriminator model architecture further includes a frame discriminator configured to differentiate between frames representing sequence subsets of the real sequence and the generated sequence.

In another aspect, the relational discriminator, the sequence discriminator, the gradient discriminator, and the frame discriminator are trained simultaneously.

In another aspect, the data objects are videos, and the element layouts are layouts representative of physical positioning of physical articles represented in the videos.

In another aspect, the data objects are time series transaction records for an individual or an organization. In this variant, the generated outputs could include simulated time series transaction records presuming that a particular event has occurred (e.g., George is married or George was able to find a job and no longer be unemployed).

In another aspect, the data objects are time series stock market data for an organization or a stock portfolio. As noted above, the generated outputs could include simulated stock market time series data for a period of time where certain conditions are presumed (e.g., finding a large deposit of gold).

In another aspect, machine interpretable instructions for training the system are encapsulated on non-transitory computer readable media such that the instructions, when executed, cause a processor or one or more processors to conduct the training to establish the trained model.

In another aspect, machine interpretable instructions representing the training system are encapsulated on non-transitory computer readable media such that the instructions, when executed, cause a processor or one or more processors to utilize the generator in generating new composite data objects, the trained model trained in accordance with various embodiments described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4A is an example of a word embedding that can be used to establish relationships between different object/action pairs in the context of video generation, according to some embodiments.

FIG. 4B is an example of a word embedding that can be used to establish relationships between different object/action pairs in the context of transaction generation, according to some embodiments.

FIG. 8 is an example set of output frames of videos generated by example proposed systems, according to some embodiments.

DETAILED DESCRIPTION

Despite the promising success of generative models in the field of image and video generation, the capability of video generation models is limited to constrained settings. Task-oriented generation of realistic videos is a natural next challenge for video generation models. Human activity videos are a good example of realistic videos and serve as a proxy to evaluate action recognition models.

Current action recognition models are limited to the predetermined categories in the dataset. Thus, it is valuable to be able to generate video corresponding to unseen categories and thereby enhancing the generalizability of action recognition models even with limited data collection. Embodiments described herein are not limited to videos, and rather extend to other types of composites generated based on unseen combinations of categories.

Figure 1:
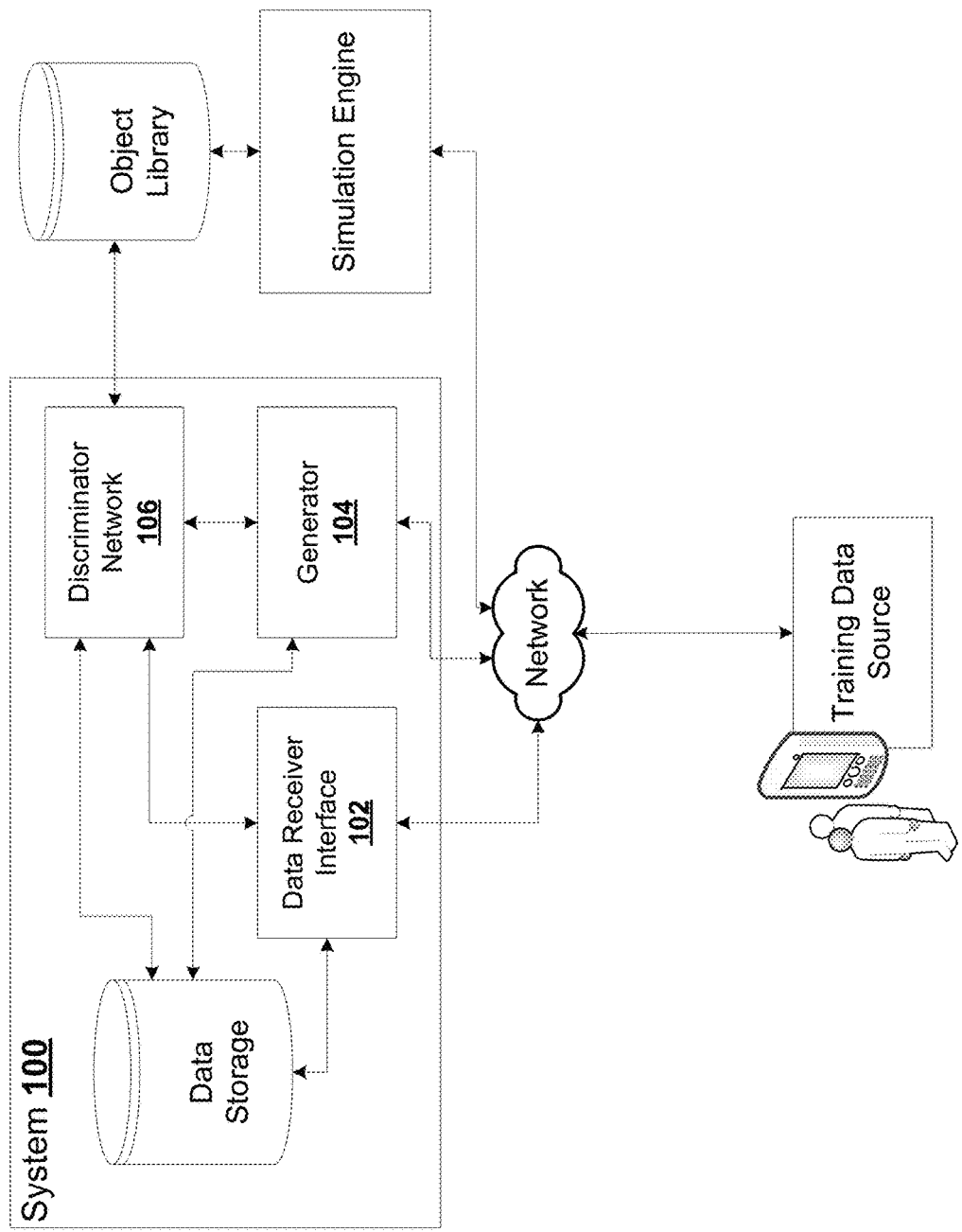
FIG. 1 is an example generative adversarial network system, according to some embodiments.

FIG. 1 is an example generative adversarial network system, according to some embodiments. The generative adversarial network system 100 is adapted to generate one or more composite data objects, which are one or more data structures representing an unseen composition. Training data can be received at a data receiver interface 102, along with a target category indication that represents a desired unseen composition.

Concretely, the conditional inputs to the system 100 can be semantic labels (e.g., of action and object), and a single start frame with a mask providing the background and location for the object. Then, the model has to create the object, reason over the action, and enact the action on the object (leading to object translation and/or transformation) over the background, thus generating the interaction video.

During training of the generator, the system 100 can utilizes four discriminators (or subsets thereof having one or more of the discriminators)—three pixel-centric discriminators, namely, frame discriminator, gradient discriminator, sequence (video) discriminator; and one object-centric relational discriminator. The three pixel-centric discriminators ensure spatial and temporal consistency across the frames. The novel relational discriminator leverages spatio-temporal scene graphs to reason over the object layouts in videos ensuring the right interactions among objects. Through experiments, Applicants show that the proposed GAN framework of various embodiments is able to disentangle objects and actions and learns to generate videos with unseen compositions. Different performance can be obtained by using different variations of the discriminator networks.

The discriminator networks can be established using neural networks, for example, implemented on computer circuitry and provided, for example, on a computer server or distributed computing resources. Neural networks maintain a number of interconnected nodal data objects which when operated in concert, process incoming data to generate output data through traversal of the nodal data objects.

Over a period of training epochs, the architecture of the neural network is modified (e.g., weights represented as data values coupled to each of the nodal data objects are changed) in response to specific optimization of an objective function, such that the processing of inputs to outputs is modified.

As noted below, each of the discriminator networks is configured for different tracking, and Applicant provides experimental validation of some embodiments.

The components shown in blocks in FIG. 1 are implemented using computer components, including processors, computer memory, and electronic circuitry. In some embodiments, system 100 is a computer server configured for machine learning and composite generation, and may interface with a simulation engine and an object library, which interoperate to submit requests for composite generation. Composites are generated as new data objects for downstream processing.

The simulation engine may, for example, be used for scenario generation and evaluation of potential simulated events and responses thereof. For example, composite data objects can be used to generate data representations of hypothetical transactions that someone may undertake upon the birth of a new baby (diaper purchases), etc. Other types of composite data objects can include stock market/equity market transaction records and event information.

In the context of a composite video, the video may, for example, be uploaded to a new object library storing simulations. In the context of a sequence of transactions, a data structure may be generated encapsulating a set of simulated transactions and/or life events, for example.

As described herein, a discriminator network 106 is provided that is adapted to evaluate and contribute to an aggregated loss function that combines sequence level discrimination, frame (e.g., subsets of sequences) level discrimination, and foreground discrimination (e.g., assigning sub-areas of focus within frames). Generator network G 104 is depicted with a set of 4 discriminators: (1) a frame discriminator $D_f$, which encourages the generator to learn spatially coherent content (e.g., visual content); (2) a gradient discriminator $D_g$, which incentivizes G to produce temporally consistent frames; (3) a video discriminator $D_v$, which provides the generator with global spatio-temporal context; and (4) a relational discriminator $D_r$, which assists the generator in producing correct object layouts (e.g., in a video). The system 100 can utilize all or a subset of the discriminator networks. While some examples and experimentation describe using all of the networks together, the embodiments are not meant to be limited to using them all together.

The frame discriminator, gradient discriminator, and video discriminators can be considered pixel-centric discriminators, while the relational discriminator can be considered an object (e.g., in the context of a video, physical article, or in the context of stock market or transaction data analysis, event) based discriminator. The discriminators can be operated separately in some embodiments, which can increase performance as parallelization is possible across different devices, different threads, or different processor cores.

The video discriminator is configured to process a block of frames as one, and conduct an analysis based on whether this set of frames is similar to what it is supposed to appear to be. For example, in the context of a transaction flow, the client becomes married, moves somewhere—if one were to generate the future sequence as a whole, the video discriminator would look at the whole set of frames—e.g., determine whether this set of time-series slices look like a realistic month for that client. While slices for a video set of frames can be considered two dimensional images, the video discriminator described herein can also be applied in respect of single dimensional information (e.g., for transaction flows).

The temporal gradient is configured to effectively avoid abrupt changes to promote consistency over time. In the context of a video, for example, a person should not jump from one physical location and jumping to another location between frames—e.g., pixels in a video should be smooth with occasionally transitions, and there is a bias towards having them more often smooth than not.

The relational discriminator, for example, can track elements that are consistent across multiple frames (e.g., slices of time) and track their corresponding layouts (e.g., spatial layouts, or based on other types of vector distance-based "layouts"). For example, spatial layouts can include positioning of physical articles in the context of a video (e.g., background articles such as tables, cutting boards), and in the context of a transaction flow, this can include the tracking of events that persist across frames (e.g., raining, heat wave, Christmas holidays), among others. The spatial layout in respect of event tracking can be based on assigned characterizations that can be mapped to vectors or points in a transformed representative space, and "spatial" distances can then be gauged through determining vector distances (e.g., through mapping to a Euclidean space or other type of manifold space).

The difference in the relational discriminator as opposed to the video discriminator is that it tracks, for example, on a specific event or characteristic that persists over a set of time series slices in querying whether the generated output is realistic.

The aggregated loss function provided by the discriminator network 106 is combined with a generator 104, such that the generator 104 (e.g., generator model architecture), operating in concert with the discriminator network 106 (e.g., discriminator model architecture), provides the overall generative adversarial network system 100.

In various embodiments, one, two, three, or all four of the discriminators can be used together. In an example embodiment pretrained word embeddings can be used for semantic representations of actions and objects, and all discriminators are conditioned on word embeddings of the characteristic pair (e.g., in the context of a video, it can be action ($s_a$) and physical object/object ($s_o$)) and all discriminators can be trained simultaneously in an end-to-end manner. For example, the discriminators can be implemented using python code that runs on different processors for generation time, run separately (e.g., parallelized over a number of CPUs, for example, based on data parallelism or model parallelism).

The generator 104 is optimized to generate composite data from the underlying training data that is difficult for the discriminator network to differentiate from it establishes as "real data" (as extracted from the training data).

As a simplified description, the generator 104 generates novel candidate data object composites which are then evaluated by discriminator network 106 and accepted/rejected. Ultimately, the system 100 attempts to output the data object composites which the discriminator network 106 is unable to distinguish as synthesized, and thus would be considered computationally as part of the real data distribution.

The generative adversarial network system as provided in various embodiments, is a conditional generative adversarial network system that maintains a computer-based representation in memory that is updated over a period of training iterations and/or reinforcement learning feedback iterations to estimate a mapping (e.g., a transfer/policy function) between conditioning variables and a real data distribution.

The generative adversarial network system can store, on a data storage 108, a memory object representation, maintained, for example, as one or more neural networks.

The neural networks may be represented as having interconnected computing nodes, stored as data structure objects, that are linked to one another through a set of link weights, filters, etc., which represent influence/activation associated with the corresponding computing nodes. As the neural networks receive feedback during training or reinforcement learning, the neural networks iteratively update and tune weightings and connections.

The interconnections and computing nodes can represent various types of relationships that together provide the policy/transfer function, being tweaked and refined across numerous iterations by, in some embodiments, computationally attempting to minimize errors (e.g., as defined by a loss function). The generative adversarial network system, in some embodiments, can utilize support vector machines, or other types of machine learning computing representations and data architectures.

The training data includes example training compositions and data objects that show linkages between different labels associated with the data objects. In an example embodiment, the training data includes data objects primarily labelled across two categories, the two categories providing a pairwise relationship.

In variants, there may be more than two categories. The pairwise relationships are used to establish training examples that aid in generating interferences, and underlying vectorized metadata and other labels, in some embodiments, expanding upon the category labels, aid in providing additional context.

The categories, as provided in some embodiments, can include action/object pairs associated with underlying training data objects. The training data objects can be associated with vector data structures storing metadata, which together is used to establish relationships in the underlying data.

When a request to generate a new composite data object is received, the system 100 utilizes the generative adversarial network to attempt to create the composite data object by combining aspects of the underlying training data, compositing aspects in an attempt to create a data object that cannot be distinguished by the discriminator (or minimizes a loss function thereof).

However, as the system 100 has not encountered any training data representing the combination required in generating the composite data object ("zero shot"), it has to determine which aspects of the underlying training data to transform, combine, merge, or otherwise stitch together to generate the composite data object.

Figure 2:
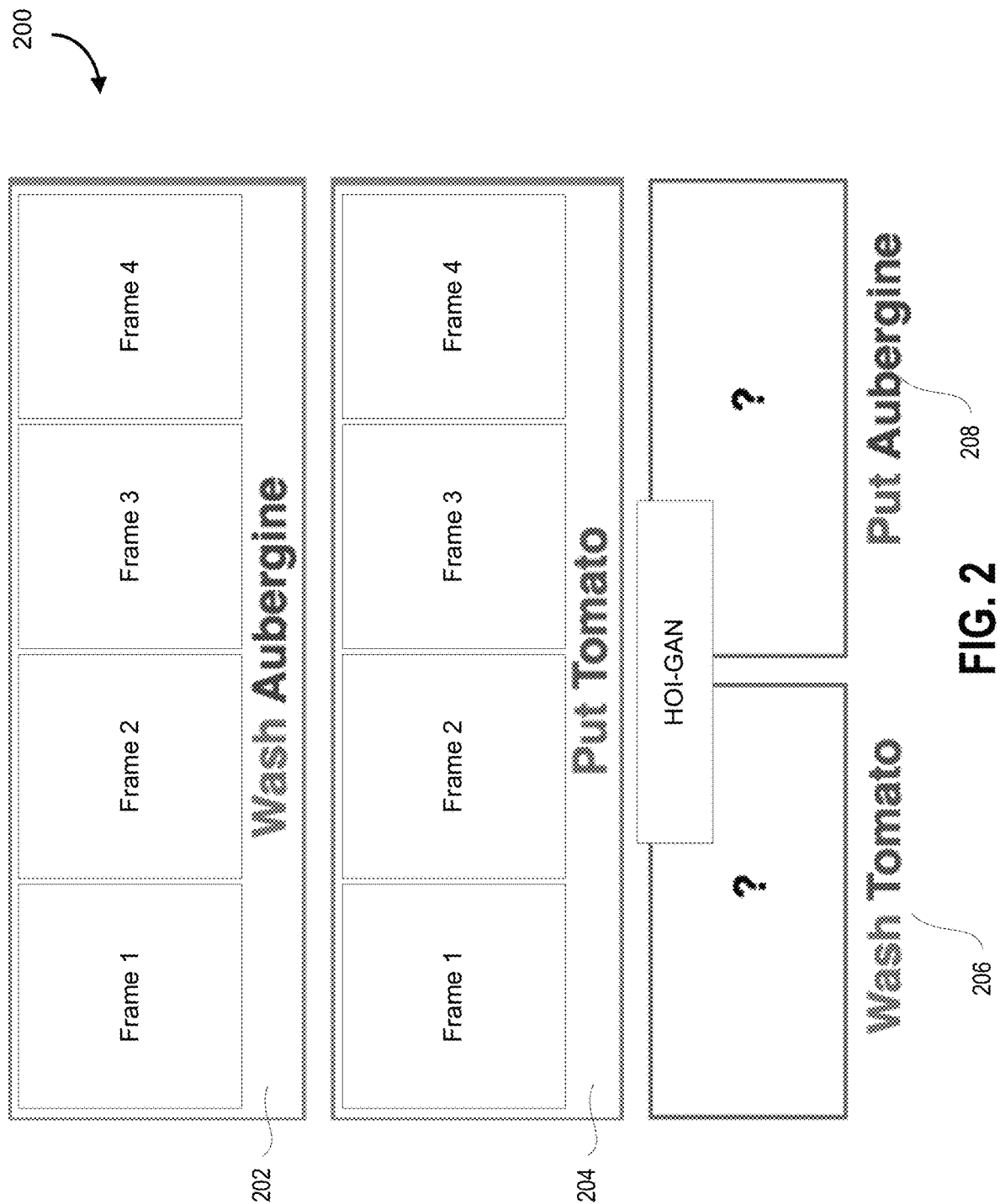
FIG. 2 is a set of illustrations showing an example approach in relation to human-object interaction (HOI) videos, according to some embodiments.

In the example of FIG. 2, an example approach 200 is described in relation to human-object interaction (HOI) videos 202 and 204. Generation of HOI videos would abridge the gap between the requirement of training data for recognition models on one hand (the more the better) and data collection (the lesser the cheaper). Furthermore, it is valuable to be able to learn recognition models that generalize well over unseen categories or compositions.

Consider the action sequences for "wash aubergine" (A1: wash, O1: aubergine) and "put tomato" (A2: put, O2: tomato) in FIG. 2, as humans it is likely that after looking at these videos, humans would be able to imagine the sequences for categories "wash tomato" (A1,O2) 206 and "put aubergine" (A2,O1) 208 without explicitly looking at the corresponding videos. Individual frames of sequences 202 and 204 may show, for example, the actions being conducted, including still image frames showing the objects, and actions being conducted with them, having movement and interactions being captured in differences between frames. For example, wash aubergine, 202 may include a person's hands lifting the aubergine, and washing and cleaning the aubergine in successive frames. Similarly, for put tomato 204, the tomato may be observed being lifted and moved across frames to be disposed on a table, for example, on a plate.

A composite video may focus on replacing aspects of the videos to shift a tomato into the wash video, or to put an aubergine in the put video, replacing parts of the frames, and in some embodiments, applying transformations to modify the aspects that do not particularly fit to better fit in the context of the composite videos (e.g., the shapes may not match exactly).

Thus, besides providing more training data for recognition models, the advantages of generating HOI videos in zero-shot compositionality setting are multifold: (1) including unseen compositions in the training data would enhance the generalizability of our recognition models; and (2) generated videos can serve as a testbed for several visual reasoning tasks such as counterfactual reasoning.

A task of generating HOI videos with unseen compositions of action and physical article having seen the action and physical article pertaining to that combination independently is proposed in relation to this example, and referred to this "zero-shot HOI video generation".

Towards this goal, based on the observation that the human activity videos are typically labeled as compositions of an action and a object (e.g., physical article) involved in that action, in an aspect, a task of generating human-object interaction videos in zero-shot compositionality setting is proposed. To generate zero-shot human-object interaction videos, a conditional DCGAN based multi-adversarial GAN is proposed that is configured for focusing on different aspects of a video. Finally, the approach is evaluated on two challenging datasets: Dataset 1 and Dataset 2.

As described herein, the task of zero-shot HOI video generation is introduced. Specifically, given the videos of a set of action and object compositions, an approach proposes to generate unseen compositions having been seen the action and object of a target composition individually, i.e., the target action paired with another object in the existing dataset or the target object being involved in another action in the dataset.

A conditional GAN based generative framework is proposed to generate videos for zero-shot HOI interactions in videos. The proposed framework adopts a multi-adversary approach with each adversarial network focusing on different aspects of the video to train a generator network. Specifically, given an action and object labels along with an image as a context image of the scene, the generator learns to generate a video corresponding to the given action and object in the scene given as the context.

Empirical results and extensive evaluation of an example model is conducted on both subjective and objective metrics demonstrating that the proposed approach outperforms the video generation baselines for two challenging datasets: Dataset 1 and Dataset 2.

Overall, approaches are valuable in enhancing the generalization of HOI models with limited data acquisition. Furthermore, embodiments described herein provide a way to accelerate research in direction of the robust transfer learning based discriminative tasks in human activity videos, thus taking the computational AI systems a step closer to robust understanding and reasoning of the visual world.

Model

To generate videos of human-object interactions, a generative multi-adversarial network is proposed.

Figure 3A:
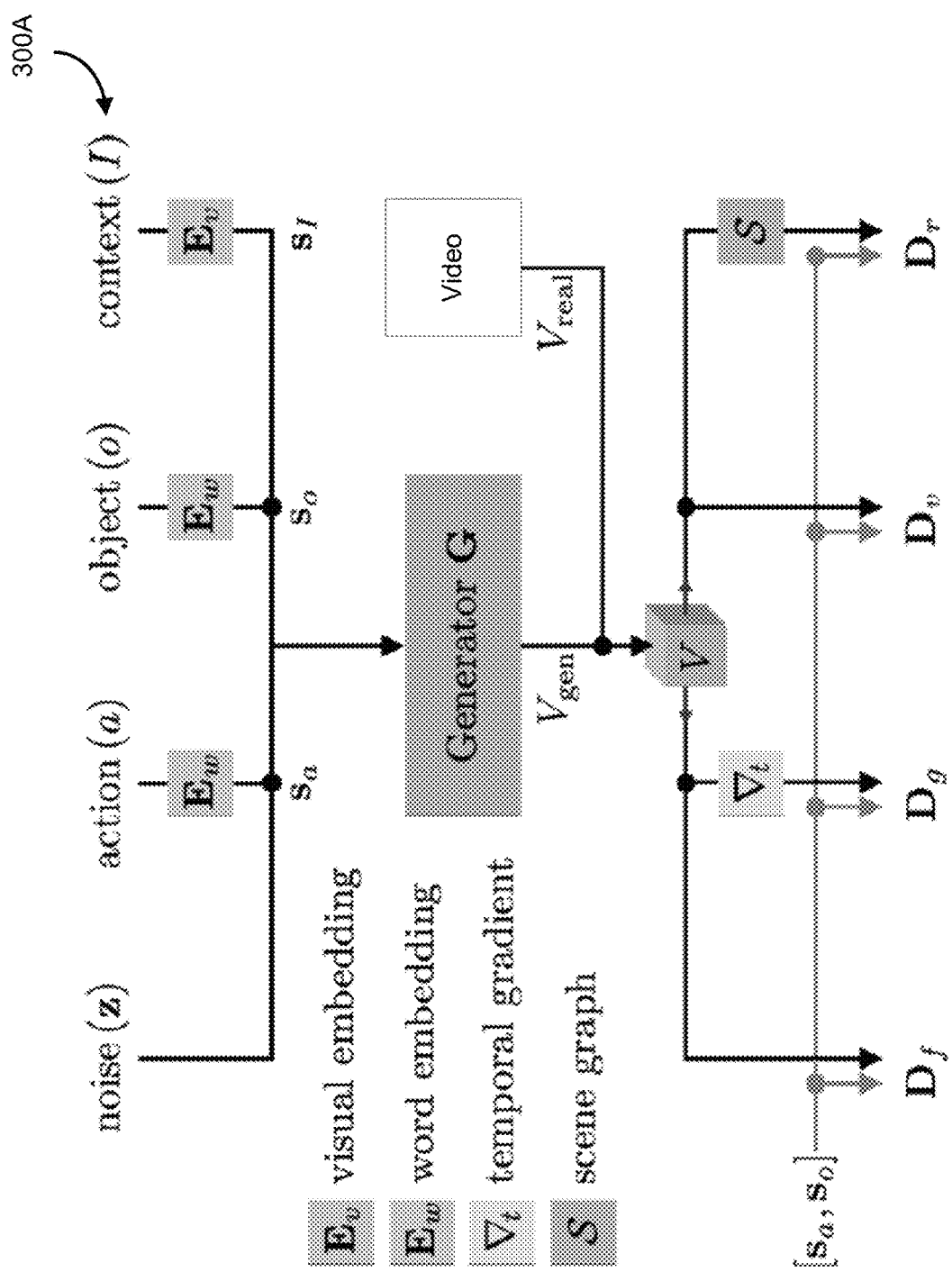
FIG. 3A is an example block rendering of an example generative multi-adversarial network, according to some embodiments.

FIG. 3A is an example block rendering 300A of an example generative multi-adversarial network, according to some embodiments. Information is shown to be provided to a generator, which generates Vgen (generated data objects) for comparison with Vreal (real data objects). For example, the data objects can be time series based data, such as videos, transaction data, or stock market data, according to various embodiments.

The generator operates in conjunction with the discriminator networks in an attempt to computationally and automatically reduce the loss between Vgen and Vreal. Aspects of information, for example, can be extracted and converted into visual embeddings, word embeddings, among others. Furthermore, as described in further detail below, a scene graph data structure can be maintained which aids in relational discrimination tasks. All or a subset of the discriminators can operate in concert to provide feedback data sets to the generator for incorporation to inform how the generator network should be modified to reduce the loss. Accordingly, over a training period, the generator network along with the discriminator networks are continuously updated.

Figure 3B:
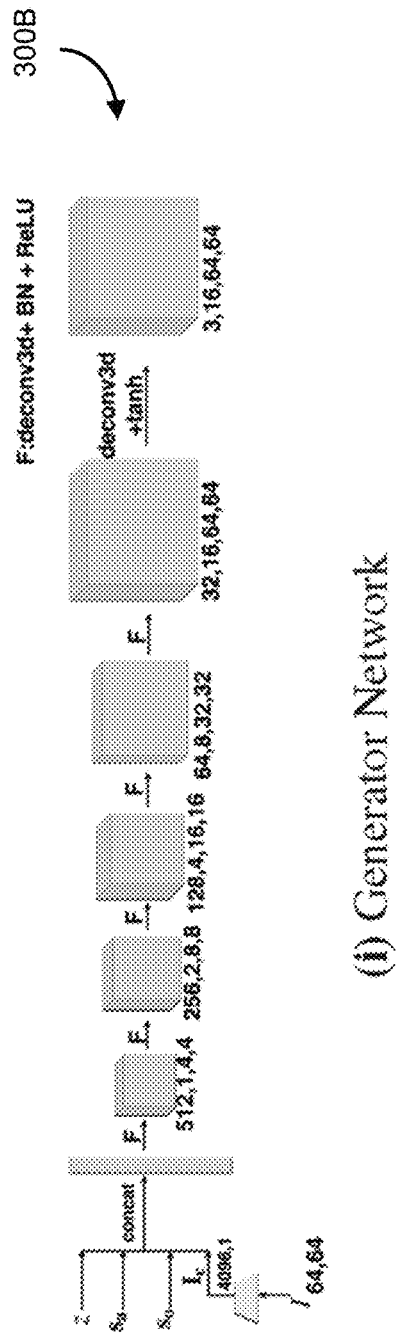
FIG. 3B is a more in-depth rendering of components of the discriminator network, according to some embodiments.
Figure 3B:
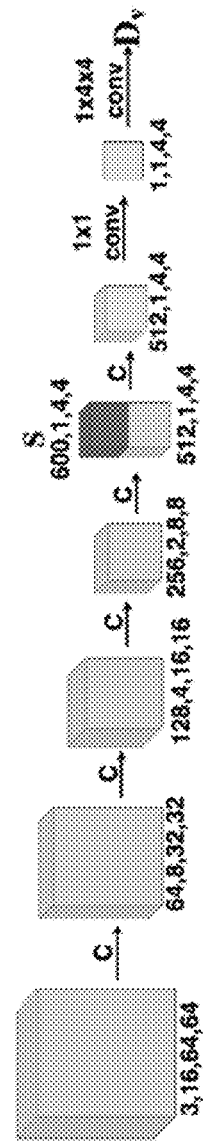
Figure 3B:
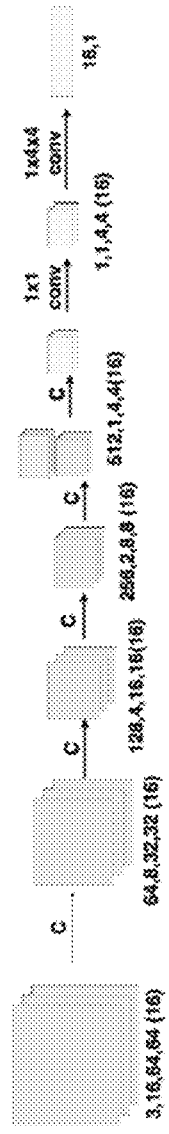

FIG. 3B is a more in-depth rendering 300B of components of the discriminator network, according to some embodiments.

This model focuses on several aspects of videos, namely, each of the frames of the video, temporally coherent frames and salient objects involved in the activity in the video.

A detailed description of an example model architecture is as follows.

Preliminaries

Generative Adversarial Networks (GAN) consist of two models, namely, generator G and discriminator D that compete with each other. On one hand, the generator G is optimized to learn the true data distribution $p_{data}$ by generating data that is difficult for the discriminator D to differentiate from real data.

On the other hand, D is optimized to differentiate real data and synthetic data generated by G. Overall, the training follows a two-player zero-sum game with the objective function described below.

$$\min_G \max_D \mathcal{L}(G, D) = \mathbb{E}_{x \sim p_{data}}[\log D(x)] + \mathbb{E}_{x \sim p_z}[\log(1 - D(G(z)))]$$

where $\tilde{z}$ is a noise vector sampled from a distribution $p_z$ such as uniform or Gaussian distribution and x is the real data sample from the true data distribution $p_{data}$.

Conditional GAN is a variant of GAN where both generator and discriminator are provided conditioning variables c. Subsequently, the network is optimized using the similar zero-sum game objective to obtain $G(\tilde{z}, c)$ and $D(x, c)$. The class of GANs allows the generator network G to learn a mapping between conditioning variables c and the real data distribution.

Proposed Model

Based on the above discussion, a model is introduced on conditional GANs and the training of the model is described in some embodiments. In the following examples, there is a description of each of the elements of the proposed framework below. Overall, the four discriminator networks, i.e., frame discriminator $D_f$, gradient discriminator $D_g$, video discriminator $D_v$, and relational discriminator $D_r$, are all involved in a zero-sum game with the generator network G.

Problem Formulation. Let $s_a$ and $s_o$ be the semantic embedding of action and object label. In the context of non-video examples, these can be two different labelled characteristics instead. Let I be the image provided as a context for the sequence (e.g., video) generation. The approach encodes I using an encoder $E_v$ to obtain an embedding s I, which can be referred to as a context vector. The goal is to generate an output object (e.g., video) $V = (V^{(i)})_{i=1}^T$ of length T depicting the action a performed on the object o with context image I as the background of V. To this end, the system 100 learns a function G: $(z, s_a, s_o, s\ I) \mapsto V$, where z is a noise vector sampled from a distribution $p_z$, such as a Gaussian distribution.

The sequence may, in some embodiments, be a set of sequential data elements, such as frames representing transaction events, rather than videos, and videos are used as a non-limiting, illustrative example.

The context image is encoded using an encoder E to obtain $I_c$ as the context vector.

Let V be the target video to be generated consisting of T(>0) frames $V^1, V^2 \ldots V^T$. The overall goal is to learn a function $G: l(\tilde{z}, s_a, s_o, I_c) \mapsto V$ where z is the noise vector sampled from a distribution $p_z$ such as uniform or Gaussian distribution.

An adversarial approach is proposed with multiple adversaries working simultaneously to learn this generator function. Concretely, the generator network G is trained using four discriminator networks described below: (1) sequence (video) discriminator $D_v$, (2) frame discriminator $D_f$, (3) gradient discriminator $D_g$, and (4) foreground discriminator $D_{fg}$ as shown in FIG. 3A, and FIG. 3B (i). Not all of the discriminator networks need to be used together, in variant embodiments, one or a plurality of the discriminator networks in various combinations are used.

Sequence (Video) Discriminator Given semantic embeddings $s_a$ and $s_o$ of action and object labels, the sequence (video) discriminator network $D_v$ learns to distinguish between the real video $V_{real}$ and generated video $V_{gen} = G(\tilde{z}, s_a, s_o, I_c)$.

The network comprises of stacked 3D convolution layers each followed by Batch Normalization layer and LeakyReLU layer with a=0.2 except the last layer which has only sigmoid activation layer, shown in FIG. 3B (ii). The objective function of the network $D_v$ is the following loss function $L_v$.

$$L_v = \frac{1}{2}[\log(D_v(V_{real}, s_a, s_o)) + \log(1 - D_v(V_{gen}, s_a, s_o))]$$

The video discriminator network $D_v$ learns to distinguish between real videos $V_{real}$ and generated videos $V_{gen}$ by comparing their global spatio-temporal contexts. The architecture consists of stacked conv3d layers, i.e., 3D convolutional layers followed by spectral normalization and leaky ReLU layers with a=0.2.

The system obtains a $N \times d_0 \times w_0 \times h_0$ tensor, where N, $d_0$, $w_0$, and $h_0$ are the channel length, depth, width, and height of the activation of the last conv3d layer respectively. We concatenate this tensor with spatially replicated copies of $s_a$ and $s_o$, which results in a tensor of size $(\dim(s_a) + \dim(s_o) + N) \times d_0 \times w_0 \times h_0$, where $\dim(\cdot)$ returns the dimensionality of a vector. The system then applies another conv3d layer to obtain a $N \times d_0 \times w_0 \times h_0$ tensor.

Finally, the system applies a $1 \times 1 \times 1$ convolution followed by a $d_0 \times w_0 \times h_0$ convolution and a sigmoid to obtain the output, which represents the probability that the video V is real. The objective function of the network $D_v$ is the following loss function:

$$L_v = \frac{1}{2}[\log(D_v(V_{real}; s_a, s_o)) + \log(1 - D_v(V_{gen}; s_a, s_o))s_o)].$$

Frame Discriminator Given semantic embeddings $s_a$ and $s_o$ of action and object labels, the frame discriminator network $D_f$ is optimized to differentiate between each of the frames of the real video $V_{real}$ and that of the generated video $V_{gen} = G(\tilde{z}, s_a, s_o, I_c)$. In an example embodiment, each of the T frames are processed independently using a network consists of stacked 2D convolution layers each followed by Batch Normalization layer and LeakyReLU layer with a=0.2 [47] except the last layer which has only sigmoid activation layer, shown in FIG. 3B (iii).

The frame discriminator network $D_f$ learns to distinguish between real and generated frames corresponding to the real video $V_{real}$ and generated video $V_{gen} = G(z, s_a, s_o, s_I)$ respectively. Each frame in $V_{gen}$ and $V_{real}$ can be processed independently using a network consisting of stacked conv2d layers, i.e., 2D convolutional layers followed by spectral normalization and leaky ReLU layers with a=0.2.

The system then obtains a tensor of size $N^{(t)} \times w_0^{(t)} \times h_0^{(t)}$ (t=1, 2, ..., T), where $N^{(t)}$, $w_0^{(t)}$, and $h_0^{(t)}$ are the channel length, width and height of the activation of the last conv2d layer respectively.

This tensor is concatenated with spatially replicated copies of $s_a$ and $s_o$, which results in a tensor of size $(\dim(s_a) + \dim(s_o) + N^{(t)}) \times w_0^{(t)} \times h_0^{(t)}$. The system then applies another conv2d layer to obtain a $N \times w_0^{(t)} \times h_0^{(t)}$ tensor, and the system now performs $1 \times 1$ convolutions followed by $w_0^{(t)} \times h_0^{(t)}$ convolutions and a sigmoid to obtain a T-dimensional vector corresponding to the T frames of the video V. The i-th element of the output denotes the probability that the frame $V^{(i)}$ is real.

An example objective function of the network $D_f$ is defined below.

The output of $D_f$ is a T-dimensional vector corresponding to each of the T frames of the video (real or generated).

$$-2ptL_f = \frac{1}{2T}\sum_{i=1}^{T}[\log(D_f^{(i)}(V_{real}; s_a, s_o)) + \log(1 - D_f^{(i)}(V_{gen}; s_a, s_o))],$$

where $D_f^i$ is the i-th element of the T-dimensional output of the frame discriminator network $D_f$.

Another variation of the objective function is the loss function:

$$L_f = \frac{1}{2T}\sum_{i=1}^{T}[\log(D_f^{(i)}(V_{real}; s_a, s_o)) + \log(1 - D_f^{(i)}(V_{gen}; s_a, s_o))],$$

where $D_f^i$ is the i-th element of the output of the frame discriminator.

Gradient Discriminator

The gradient discriminator network $D_g$ enforces temporal smoothness by learning to differentiate between the temporal gradient of a real video $V_{real}$ and a generated video $V_{gen}$. The temporal gradient $\nabla_t V$ of a video V with T frames $V^{(1)}, \ldots, V^{(T)}$ is defined as pixelwise differences between two consecutive frames of the video. The i-th element of $\nabla_t V$ is defined as:

$$[\nabla_t V]_i = V^{(i+1)} - V^{(i)}, i=1,2,\ldots,(T-1).$$

Given semantic embeddings $s_a$ and $s_o$ of action and object labels, the frame discriminator network $D_g$ is optimized to differentiate between pixelwise gradient of the real video $\delta V_{real}$ and that of the generated video $\delta V_{gen}$.

The pixelwise gradient is a domain-specific aspect that may be different based on different types of target composite data objects. For example, if the composite data object is a linked transaction data structure associated with an event (e.g., coffee shop purchase after job promotion), a different component may be utilized. The gradient discriminator aids in avoiding "jagged" or aberrant shifts as between different sequential sequence elements (e.g., in the context of a video, abrupt jumps between pixels of proximate frames).

The architecture of the gradient discriminator $D_g$ can be similar to that of the frame discriminator $D_f$. The output of $D_g$ is a (T−1)-dimensional vector corresponding to the (T−1) values in gradient $\nabla_t V$.

The objective function of $D_g$ is $$L_g = \frac{1}{2(T-1)}\sum_{i=1}^{T-1}[\log(D_g^{(i)}(\nabla_t V_{real}; s_a, s_o)) + \log(1 - D_g^{(i)}(\nabla_t V_{gen}; s_a, s_o))],$$

where $D_g^{(i)}$ is the i-th element of the output of $D_g$.

Foreground Discriminator The foreground of the sequence (video) V with T frames $V^1 \ldots V^T$ can be defined with corresponding foreground mask M with T foreground masks $m^1 \ldots m^T$ corresponding to the T frames.

$$F^t = m^t \odot V^t + (1-m^t) \odot V^t, t=1,2\ldots T \quad (6)$$

where $\odot$ is elementwise multiplication of the mask and corresponding frame.

The foreground discriminator is adapted to track and focus attention of the discriminator network in relation to sub-portions of a frame, and in some embodiments, track these attention elements as they move relative to the frame. In the context of a video, if the desired data object is "cut aubergine", focus may be emphasized on pixels or interface elements representing knife and/or the eggplant, and more specifically on the part of the eggplant being cut.

The focus may be tracked as, for example, a knife and an eggplant translate and rotate in 3-D space and such movements are tracked in the frames of the video. In the context of FIG. 3A, m refers to a mask, which is used, in some embodiments, to identify to areas of focus for the discriminator.

Different approaches can be used to establishing focus—in some embodiments, a human or other mechanism may establish a "ground truth" portion, but such establishing may be very resource intensive (e.g., human has to review and flag sections). Other approaches include generating or establishing ranges and/or areas automatically, for example, using bounding boxes (bboxes) or masks (e.g., polygons or other types of continuous shapes and/or rules).

In relation to a potential sequence of transactions (instead of videos/screen frames), each transaction may be considered a frame. In this example, a ground truth may be established based on which transactions are involved—for example, rent payments can be flagged and tagged.

In another embodiment, a bounding box can be established based on a region of time of payments which are likely to be rent payments (e.g., first of the month). In another embodiment, masks are used as an automated way of getting a detailed estimate of which payments are relevant as rent payments.

Given semantic embeddings $s_a$ and $s_o$, of action and object labels, the frame discriminator network $D_{fg}$ is optimized to differentiate between pixelwise gradient of the real video $\delta V_{real}$ and that of the generated video $\delta V_{gen}$.

The architecture for foreground discriminator $D_g$ can be similar to that of frame discriminator. The objective function of the network $D_{fg}$ is defined below. The output of $D_{fg}$ is a T-dimensional vector corresponding to each of the T foreground frames of the sequence (e.g., video) (real or generated).

$$L_{fg} = \frac{1}{2T}\sum_{i=1}^{T}[\log(D_{fg}^i(F_{real}, s_a, s_o)) + \log(1 - D_{fg}^i(F_{gen}, s_a, s_o))] \quad (7)$$

Relational Discriminator. The relational discriminator $D_r$ leverages a spatio-temporal scene graph to distinguish between object layouts in videos. Each node contains convolutional embedding, position and aspect ratio (AR) information of the object crop obtained from MaskRCNN. The nodes are connected in space and time and edges are weighted based on their inverse distance. Edge weights of (dis)appearing objects are set to 0.

Figure 3C:
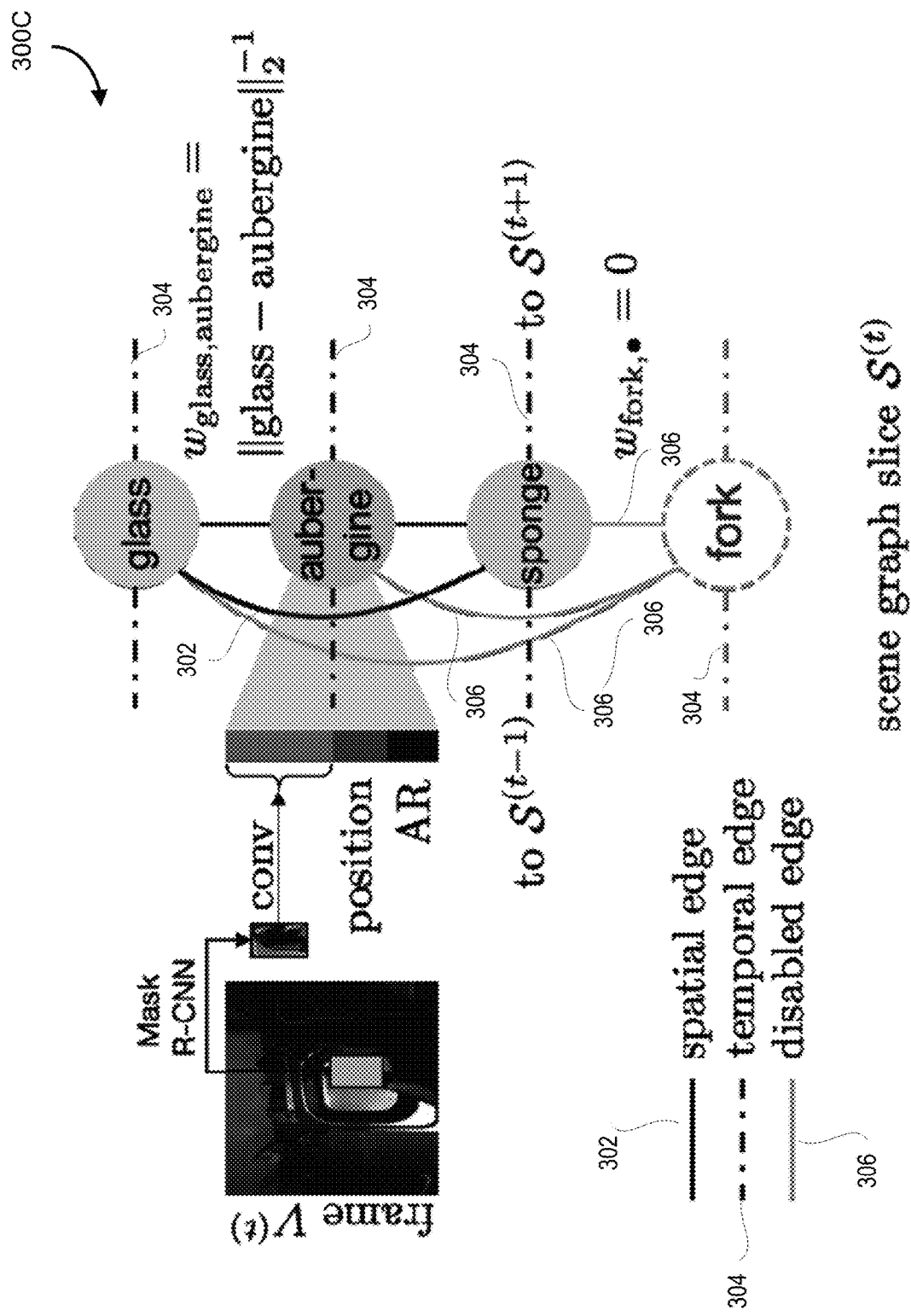
FIG. 3C is an example diagram showing a spatio-temporal scene graph, according to some embodiments.

In addition to the pixel-centric discriminators above, Applicants also propose a novel object-centric discriminator $D_r$. Driven by a spatio-temporal scene graph, this relational discriminator learns to distinguish between the object layouts of real videos $V_{real}$ and generated videos $V_{gen}$ (see FIG. 3C). As shown in FIG. 3C, objects (e.g., physical articles) in this frame are tracked—glass, aubergine, sponge, fork.

Specifically, the discriminator builds a spatio-temporal scene graph $S = (\mathcal{N}, \varepsilon)$ from V, where the nodes and edges are represented by $\mathcal{N}$ and $\varepsilon$ respectively.

The scene graph can include spatial edges 302, temporal edges 304, and disabled edges 306.

The system assumes one node per object per frame. Each node is connected to all other nodes in the same frame, referred to as spatial edges 302. In addition, to represent temporal evolution of objects, each node is connected to the corresponding nodes in the adjacent frames that also depict the same object, referred to as temporal edges 304. To obtain the node representations, the system crops the objects in V using Mask-RCNN, computes a convolutional embedding for them, and then augments the resulting vectors with the aspect ratio and position of the corresponding bounding boxes.

The weights of spatial edges in ε are given by inverse Euclidean distances between the centers of these bounding boxes. The weights of the temporal edges 304 is set to 1 by default. The cases of (dis)appearing objects are handled by setting the corresponding spatial and temporal edges to 0 (e.g., disabled edge 306).

The relational discriminator $D_r$ operates on this scene graph $S$ by virtue of a graph convolutional network (GCN) followed by stacking and average-pooling of the resulting node representations along the time axis.

The discriminator is configured to then concatenate this tensor with spatially replicated copies of $s_a$ and $s_o$ to result in a tensor of size $(\dim(s_a)+\dim(s_o)+N^{(t)}) \times w_0^{(t)} \times h_0^{(t)}$.

As before, the discriminator is configured to then apply convolutions and sigmoid to obtain the final output which denotes the probability of the scene graph belonging to a real output data object (e.g., video). The objective function of the network $D_r$ is given by:

$$L_r = \frac{1}{2}[\log(D_r(S_{real}; s_a, s_o)) + \log(1 - D_r(S_{gen}; s_a, s_o))].$$

Generator. Given the semantic embeddings $s_a$, $s_o$ of action and object labels and context vector $I_c$, the generator network learns to generate T frames of size H×W×3 See FIG. 3B (i). The approach can include concatenating noise z with the conditions, namely, $s_a$, $s_o$, and s I. This concatenated vector can be provided as the input to the network G.

The network comprises stacked deconv3d layers, i.e., 3D transposed convolution layers each followed by Batch Normalization and leaky ReLU layers with a=0.2 except the last convolutional layer which is followed by a Batch Normalization layer and a tan h activation layer The network can comprise stacked 3D transposed convolution networks. Each convolutional layer can be followed by Batch Normalization layers and ReLU activation layer except the last convolutional layer which is followed by Batch Normalization layers and tan h activation layer. The network can be optimized according to the following objective function, in an embodiment.

$$L_{gan} = \frac{1}{T} \sum_{i=1}^{T} [\log(1 - D_f^{(i)}(V_{gen}; s_a, s_o))] +$$

$$\frac{1}{(T-1)} \sum_{i=1}^{T-1} [\log(1 - D_g^{(i)}(\nabla_t V_{gen}; s_a, s_o))] +$$

$$\log(1 - D_v(V_{gen}; s_a, s_o)) + \log(1 - D_r(S_{gen}; s_a, s_o))$$

FIG. 4A is an example depiction 400A of a word embedding that can be used to establish relationships between different physical article/action pairs in the context of video generation, according to some embodiments.

In this example, similar to FIG. 2, a new video is requested to be generated based off of "wash tomato". The system has observed "wash aubergine" and "put tomato" in the training set. To create "wash tomato", the system identifies aspects of the training videos for composite generation to create a composite, and in some embodiments, transforms the aspects based on other features extracted from other training data.

As the size of the training data set grows, the system's ability to mix and match, transform, and generate composites grows. For example, if the system has observed tomatoes, peaches, strawberries, etc., in videos, it may draw upon and generate new compositions based on combinations and transformations thereof based on, for example, a vector distance between the desired composition and the underlying training data vectors.

In another, more technically challenging example, the system may receive requests for unseen compositions where aspects of the unseen compositions are unknown even in the training examples. In these situations, the system may attempt generation of unknown aspects based on extending aspects of other training examples, even if such generation may yield (to humans) a fairly nonsensical result.

For example, an unseen composition may be directed to "cut peach", or "open egg", and the system may adapt aspects of other approaches and insert frame elements into these sequences based on similarities in word embeddings associated with the underlying categories and training objects. For "cut peach", the inside portion of a nectarine may be inserted into the peach since the system may have observed that a nectarine is also a stone fruit. Similarly, opening an egg may also yield nectarine inner portions as the system may not be able to identify what should be in an egg as it has never observed the insides of an egg in training, and simply picks the nectarine based on the shape of the nectarine (round).

FIG. 4B is an example depiction 400B of a word embedding that can be used to establish relationships between different object/action pairs in the context of transaction generation, according to some embodiments. In this example, the system is tasked with generating a data object that is a composite of the underlying training data elements, without having observed the data object classification in the training data.

The system in this example is tasked with generating a representation of transaction sequences in a hypothetical scenario where Michael has two children.

As shown in FIG. 4B, transaction sequences in the real world are known for Michael (with no children), and for Greg (with children). A mapping and extension of aspects of Greg to Michael would be generated as a vector representation, and, for example, a sequence of simulated transactions could be stored therein.

Figure 5:
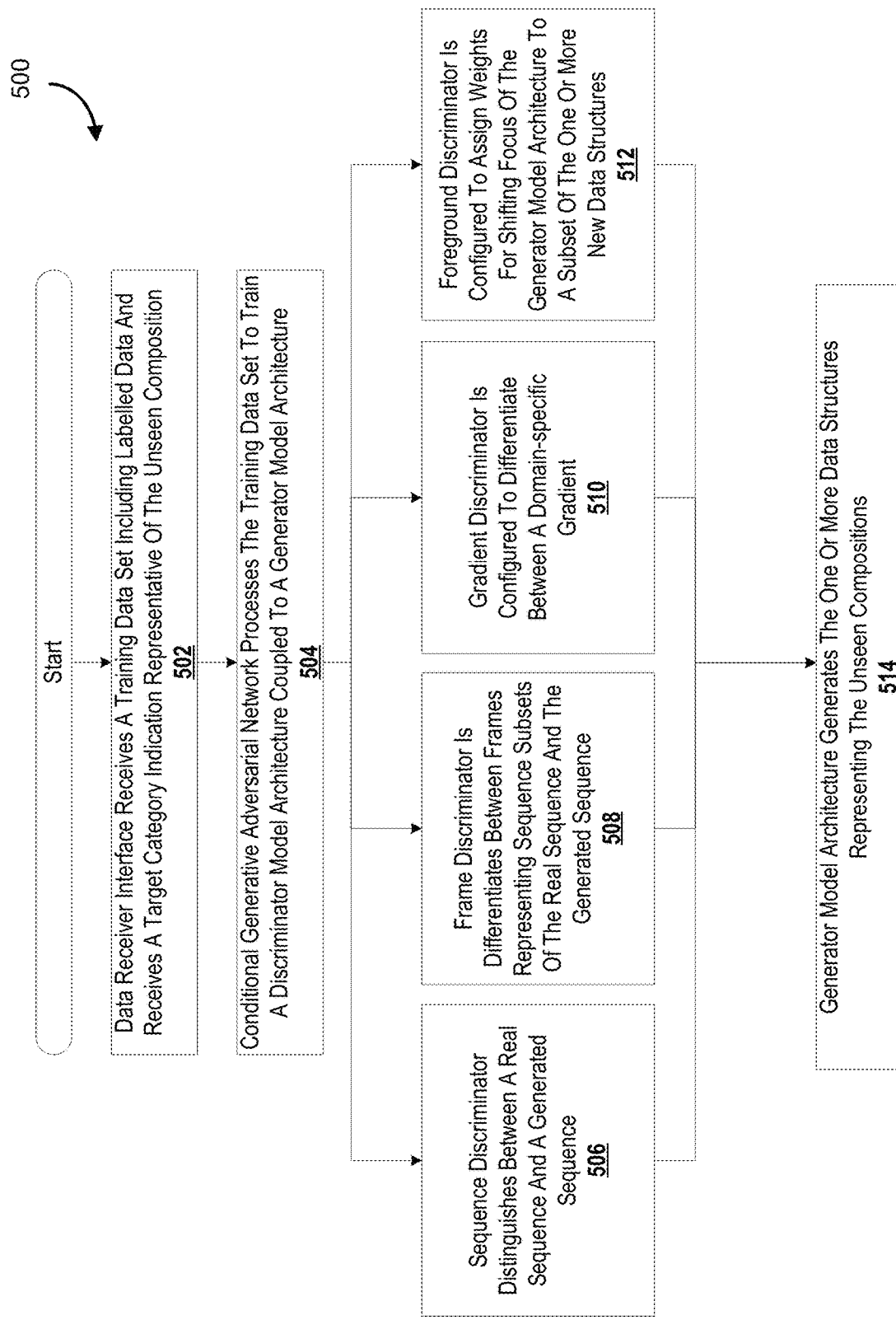
FIG. 5 is an example method for generating one or more data structures, the one or more data structures representing an unseen composition based on a first category and a second category observed individually, according to some embodiments.

FIG. 5 is an example method for generating one or more data structures, the one or more data structures representing an unseen composition based on a first category and a second category observed individually, according to some embodiments. The method 500 is shown as an example, and other steps, alternate steps, and variations are possible.

At 502, a data receiver interface receives a training data set including labelled data elements based on the first category and labelled data elements based on the second category and receives a target category indication representative of the unseen composition.

At 504 a conditional generative adversarial network processes the training data set to train a discriminator model architecture coupled to a generator model architecture, the discriminator model architecture having a plurality of adversarial networks operating in concert to train the generator model architecture.

At 506, a sequence discriminator is configured to distinguish between a real sequence and a generated sequence.

At 508, a frame discriminator is configured to differentiate between frames representing sequence subsets of the real sequence and the generated sequence.

At 510, a gradient discriminator is configured to differentiate between a domain-specific gradient determined based on the type of data structure of the one or more data structures and the training data set.

At 512, a foreground or a relational discriminator is configured to assign weights for shifting focus of the generator model architecture to a subset of the one or more new data structures based on an identified context associated with the target category indication of the unseen composition.

At 514, a generator model architecture generates the one or more data structures representing the unseen composition.

Figure 6:
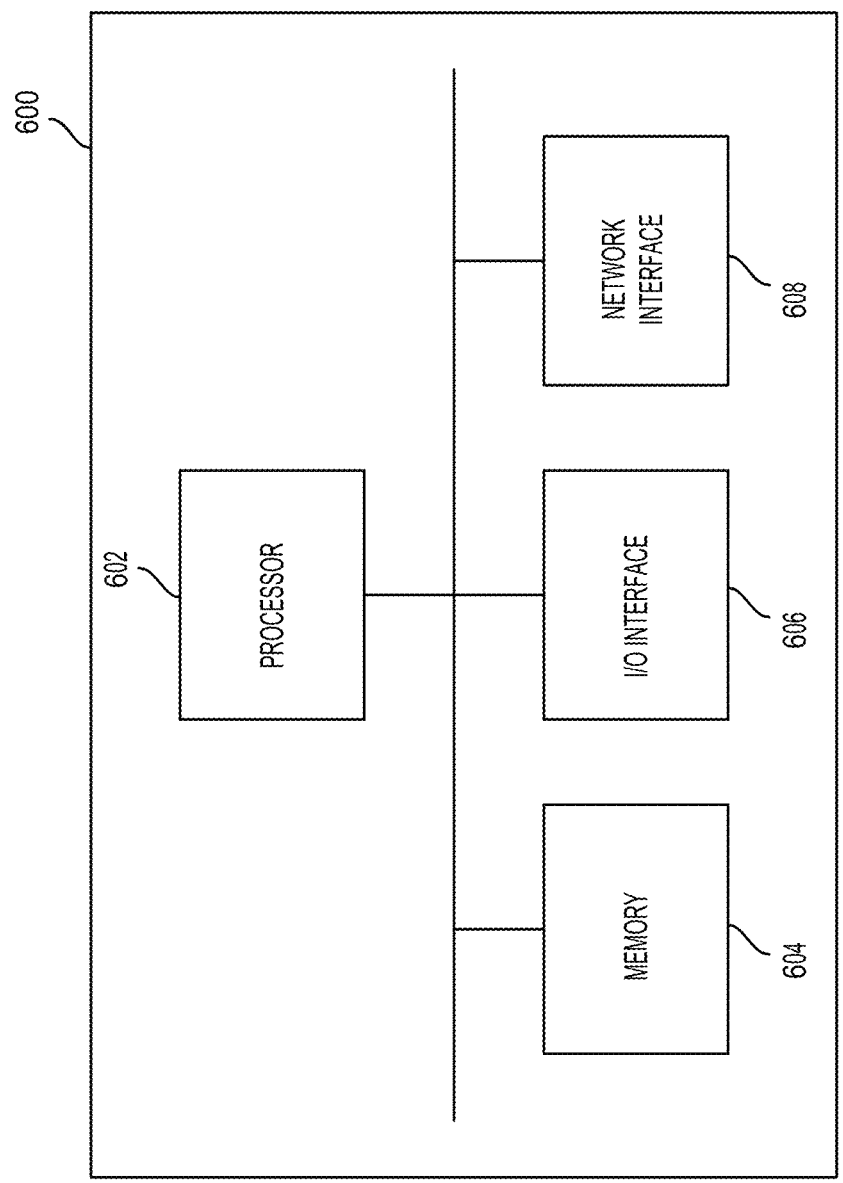
FIG. 6 is a schematic diagram of a computing device such as a server, according to some embodiments.

FIG. 6 is a schematic diagram of a computing device 600 such as a server. As depicted, the computing device includes at least one processor 602, memory 606, at least one I/O interface 606, and at least one network interface 608.

Processor 602 may be an Intel or AMD x86 or x64, PowerPC, ARM processor, or the like. Memory 604 may include a combination of computer memory that is located either internally or externally such as, for example, random-access memory (RAM), read-only memory (ROM), compact disc read-only memory (CDROM). Each I/O interface 606 enables computing device 600 to interconnect with one or more input devices, such as a keyboard, mouse, camera, touch screen and a microphone, or with one or more output devices such as a display screen and a speaker.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WiMAX), SS7 signaling network, fixed line, local area network, wide area network, and others.

Computing device 600, in some embodiments, is a special purpose machine that may reside at a data center. The special purpose machine, for example, incorporates the features of the system 100 and is provided in a portable computing mechanism that, for example, may be placed into a data center as a rack server or rack server component that interoperates and interconnects with other devices, for example, across a network or a message bus, and configured to generate insights and create new composite data objects based on training data and received data requests.

Experiments

Experiments on zero-shot human-object sequence (e.g. video) generation showcase: (1) the ability of the proposed model to generate videos in different scenarios, (2) the performance comparison of proposed approach over state-of-the-art video generation models, and (3) finally, the limitations of the proposed approach of some embodiments. As mentioned, videos are only one type of data object and other types of composite data objects are contemplated in other embodiments.

In the experiments, the convolutional layers in all networks, namely, G, $D_f$, $D_g$, $D_v$, $D_r$ have kernel size 4 and stride 2.

The approach includes generating a video clip consisting of T=16 frames having H=W=64. The noise vector z is of length 100. The parameters $w_0=h_0=4$, $d_0=1$ and N=512 for $D_v$ and $w_0^t=h_0^t=4$ and $N^{(t)}=512$ for $D_f$, $D_g$, and $D_r$. To obtain the semantic embeddings $s_a$ and $s_o$ corresponding to action and object labels respectively, Applicants use Wikipedia-pretrained GLoVe embedding vectors of length 300.

For training, Applicants use the Adam optimizer with learning rate 0.0002 and $\beta_1=0.5$, $\beta_2=0.999$ but other approaches are possible. Applicants train all models with a batch size of 32. In this experimental validation, Applicants used dropout (probability=0.3) in the last layer of all discriminators and all layers (except first) of the generator.

Dataset 1 is shown on the left and Dataset 2 is shown on the right.

TABLE 1

| | Quantitative Evaluation for GS1 | | | | | |
|---|---|---|---|---|---|---|
| | I-score ↑ | S-score ↓ | D-score ↑ | I-score ↑ | S-score ↓ | D-score ↑ |
| Baseline: C-VGAN | 1.8 | 30.9 | 0.2 | 2.1 | 25.4 | 0.4 |
| Baseline: C-TGAN | 1.5 | 35.9 | 0.4 | 2.2 | 28.9 | 0.6 |
| Ours-V | 2.0 | 29.2 | 0.3 | 2.1 | 27.2 | 0.3 |
| Ours-V + F | 2.3 | 26.1 | 0.6 | 2.5 | 22.2 | 0.65 |
| Ours-V + F + G | 2.8 | 15.1 | 1.4 | 2.8 | 14.2 | 1.1 |
| Ours-V + F + G + Fg(gt) | 4.1 | 13.1 | 2.1 | — | — | — |
| Ours-V + F + G + Fg(bboxes) | 4.0 | 14.5 | 1.9 | 5.6 | 12.7 | 2.4 |
| Ours-V + F + G + Fg(masks) | 4.8 | 11.5 | 2.9 | 6.6 | 10.2 | 3.0 |
| | Including Unlabeled Data | | | | | |
| Baseline: C-VGAN | | | | | | |
| Baseline: C-TGAN | | | | | | |
| Ours(bboxes) | 5.0 | 9.5 | 2.4 | 7.3 | 10.2 | 3.6 |
| Ours(masks) | 7.7 | 7.5 | 3.4 | 9.4 | 6.2 | 4.5 |
| | One hot encoded labels instead of embeddings | | | | | |
| Baseline: C-VGAN | | | | | | |
| Baseline: C-TGAN | | | | | | |
| Ours(bboxes) | 3.0 | 20.5 | 1.4 | 3.3 | 29.2 | 1.6 |
| Ours(masks) | 2.8 | 24.5 | 2.0 | 4.2 | 18.5 | 3.1 |

TABLE 2

| | \multicolumn{3}{c}{Quantitative Evaluation for GS2} | | | |
|---|---|---|---|---|---|---|
| | I-score ↑ | S-score ↓ | D-score ↑ | I-score ↑ | S-score ↓ | D-score ↑ |
| Baseline: C-VGAN | 1.4 | 44.9 | 0.3 | 1.8 | 40.5 | 0.3 |
| Baseline: C-TGAN | 1.5 | 35.9 | 0.4 | 1.6 | 39.7 | 0.5 |
| Ours-V | 1.2 | 42.1 | 0.4 | 1.6 | 41.1 | 0.6 |
| Ours-V + F | 2.2 | 34.1 | 0.6 | 2.2 | 37.3 | 0.7 |
| Ours-V + F + G | 2.6 | 29.7 | 1.9 | 2.4 | 27.6 | 1.7 |
| Ours-V + F + G + Fg(gt) | 3.6 | 21.1 | 2.1 | — | — | — |
| Ours-V + F + G + FG(bboxes) | 3.4 | 27.5 | 2.4 | 4.3 | 15.2 | 1.4 |
| Ours-V + F + G + FG(masks) | 3.6 | 32.7 | 3.4 | 4.6 | 12.9 | 2.4 |
| \multicolumn{7}{c}{Including Unlabeled Data} | | | | | | |
| Baseline: C-VGAN | | | | | | |
| Baseline: C-TGAN | | | | | | |
| Ours(bboxes) | 4.5 | 15.7 | 2.4 | 5.3 | 10.2 | 3.7 |
| Ours(masks) | 5.0 | 12.6 | 3.4 | 7.0 | 9.6 | 4.1 |
| \multicolumn{7}{c}{One hot encoded labels instead of embedding} | | | | | | |
| Baseline: C-VGAN | | | | | | |
| Baseline: C-TGAN | | | | | | |
| Ours(bboxes) | 2.4 | 25.5 | 1.3 | 3.6 | 32.2 | 1.6 |
| Ours(masks) | 3.6 | 21.2 | 2.1 | 4.7 | 25.2 | 3.1 |

Experimental Setup

Datasets. Two datasets: (1) Dataset 1, (2) Dataset 2 consisting of diverse and challenging human-object interaction videos ranging from simple translational motion of objects (e.g., push, move) to rotation (e.g. open) and transformations in state of objects (e.g. cut, fold).

Both of these datasets comprise a diverse set of HOI videos ranging from simple translational motion of objects (e.g. push, move) and rotation (e.g. open) to transformations in state of objects (e.g. cut, fold). Therefore, these datasets, with their wide ranging variety and complexity, provide a challenging setup for evaluating HOI video generation models.

Dataset 1 contains egocentric videos of activities in several kitchens. A video clip V is annotated with action label a and object label O (e.g., open microwave, cut apple, move pan) along with a set of bounding boxes $\mathcal{B}$ (one per frame) for objects that the human interacts with while performing the action. There are around 40000 instances in the form of (V, a, o, $\mathcal{B}$) across 352 objects and 125 actions. This dataset is referred to as Dataset 1 hereafter.

Dataset 2 contains videos of daily activities performed by humans. A video clip V is annotated with a label l with action template and one or two objects O involved in the activity (e.g., moving a book down with action template 'moving something down', hitting ball with racket with action template 'hitting something with something'). There are 220, 847 training instances of the form (V, l) across 30,408 objects and 174 action templates.

To transform the dataset from elements of the form of videos with natural language labels (V, l) to videos with action and object labels (V, a, o), Applicant used NLTK POS-tagger to obtain verbs and nouns in l as follows. Applicant derived action label a by stemming the verb (e.g. for closing, the action label a is close) in l. All of the labels in the dataset begin with present perfect form of the verb therefore, the active object O is the noun that occurs just after the verb in the label l. Applicant refer to this dataset as Dataset 2 hereafter.

Splitting by Compositions/Data Splits. To make the dataset splits suitable for the problem of zero-shot human-object interactions, the system combined the videos in the validation and train splits originally provided in the dataset and perform the split ensuring that all the unique objects and action labels in the original dataset are seen independently in training set however a particular combination of object and action present in testing set is not present in training and vice versa. Formally, the approach splits the dataset $\mathcal{D}$ into two splits training set $\mathcal{D}_{tr}$ and testing set $\mathcal{D}_{te}$ based on the set of unique actions $\mathcal{A}$ and the set of unique objects $\mathcal{O}$ in the dataset $\mathcal{D}$.

The training set $\mathcal{D}_{tr}$ contains videos with action and object label (V,a,o) with $a \in \mathcal{A}$ and $o \in \mathcal{O}$ such that the data samples, i.e., videos cover all elements in set of actions $\mathcal{A}$ and set of object $\mathcal{O}$.

Therefore, videos with both action label $a_t$ and object label $o_t$ in $\mathcal{D}_{te}$ would never occur in $\mathcal{D}_{tr}$ however video with action label $a_t$ and another object label $o_{t'}$ or another action label $a'_t$ and the object label $o_t$ can be present in $\mathcal{D}_{tr}$.

Data Processing To obtain the semantic embedding for action and object labels, one can use Wikipedia-pretrained GLoVe embeddings. Each of the embeddings are of dimension 300. To obtain the foreground masks (both bounding boxes and segmentation masks), one can use MS-COCO pretrained Mask-RCNN. The masks were obtained for both datasets.

Generation Scenarios. Two different generation scenarios are provided to evaluate the Generator model trained on the training set described earlier in the section.

Recall that the generator network in an embodiment of the proposed framework 300A (FIG. 3A) has 3 conditional inputs, namely, action embedding, object embedding, and context frame I.

The context frame serves as the background in the scene. Thus, to provide this context frame during training, the system can apply a binary mask $M^{(1)}$ corresponding to the first frame $V^{(1)}$ of a real video as $I=(1-M^{(1)}) \odot V^{(1)}$, where 1 represents a matrix of size $M^{(1)}$ containing all ones and $\odot$ denotes elementwise multiplication.

This mask $M^{(1)}$ contains ones in regions (either rectangular bounding boxes or segmentation masks) corresponding to the objects (non-person classes) detected using MaskRCNN and zeros for other regions. Intuitively, this helps ensure the generator learns to map the action and object embeddings to relevant visual content in the HOI video.

During testing, to evaluate the generator's capability to synthesize the right human-object interactions, Applicants provide a background frame as described above. This background frame can be selected from either the test set or training set, and can be suitable or unsuitable for the target action-object composition. To capture these possibilities, we design two different generation scenarios.

Specifically, in Generation Scenario 1 (GS1), the input context frame I is the masked first frame of a video from the test set corresponding to the target action-object composition (unseen during training).

In Generation Scenario 2 (GS2), I is the masked first frame of a video from the training set which depicts an object other than the target object. The original action in this video could be same or different than the target action. Refer to Table 1 to see the contrast between the two scenarios.

TABLE 1

Generation Scenarios. Description of the conditional inputs for the two generation scenarios GS1 & GS2 used for evaluation.

| Target Conditions | GS1 | GS2 |
|---|---|---|
| Target action a seen during training | ✓ | ✓ |
| Target object o seen during training | ✓ | ✓ |
| Background of target context I seen during training | x | ✓ |
| Object mask in target context I corresponds to target object o | ✓ | x |
| Target action a seen with target context I during training | x | ✓/x |
| Target object o seen with target context I during training | x | x |
| Target action-object composition (a-o) seen during training | x | x |

✓ denotes 'Yes', x denotes 'No'.

As such, in GS1, the generator receives a context that it has not seen during training but the context (including object mask) is consistent with the target action-object composition it is being asked to generate.

In contrast, in GS2, the generator receives a context frame that it has seen during training but is not consistent with the action-object composition it is being asked to generate. Particularly, the object mask in the context does not correspond to the target object. Thus, these generation scenarios help illustrate that the generator indeed generalizes over compositions.

Evaluation Metrics. Quantitative evaluation of the quality of images or videos is inherently challenging thus, Applicants use both quantitative and qualitative metrics.

Quantitative Metrics. Inception Score (I-score) is a widely used metric for evaluating image generation models. For images x with labels y, I-score is defined as $\exp(KL(\rho(y|x) \| \rho(x)))$ where $\rho(y|x)$ is the conditional label distribution of an ImageNet-pretrained Inception model. Applicants adopted this metric for video quality evaluation. Applicants fine-tune a Kinetics-pretrained video classifier ResNeXt for each of the source datasets and use it for calculating I-score (higher is better). It is based on one of the state-of-the-art video classification architectures. Applicants used the same evaluation setup for the baselines and an embodiment of the proposed model to ensure a fair comparison.

In addition, Applicants hypothesize that measuring realism explicitly is more relevant for the task as the generation process can be conditioned on any context frame arbitrarily to obtain diverse samples. Therefore, in addition to I-score, Applicants also analyze the first and second terms of the KL divergence separately.

Applicants refer to these terms as: (1) Saliency score or S-score (lower is better) to specifically measure realism, and (2) Diversity score or D-score (higher is better) to indicate the diversity in generated samples.

A smaller value of S-score implies that the generated videos are more realistic as the classifier is very confident in classifying the generated videos. Specifically, the saliency score will have a low value (low is good) only when the classifier is confidently able to classify the generated videos into action-object categories matching the conditional input composition (action-object), thus indicating realistic instances of the required target interaction. In fact, even if a model generates realistic-looking videos but depicts an action-object composition not corresponding to the conditional action-object input, the saliency score will have high values.

Finally, a larger value of D-score implies the model generates diverse samples.

Human Preference Score. Applicants conducted a user study for evaluating the quality of generated videos. In each test, Applicants present the participants with two videos generated by two different algorithms and ask which among the two better depicts the given activity, i.e., action-object composition (e.g. lift fork). Applicants evaluate the performance of an approach as the overall percentage of tests in which that approach's outputs are preferred. This is an aggregate measure over all the test instances across all participants.

Baselines. Applicants compare the approach of some embodiments with three state-of-the-art video generation approaches: (1) VGAN, (2) TGAN, and (3) MoCoGAN. Applicants develop the conditional variants of VGAN and TGAN from the descriptions provided in their papers. Applicants refer to the conditional variants as C-VGAN and C-TGAN respectively.

Applicants observed that these two models saturated easily in the initial iterations, thus, Applicants added dropout in the last layer of the discriminator network in both models. MoCoGAN focuses on disentangling motion and content in the latent space and is the closest baseline. Applicants use the code provided by the authors.

As shown in Table 2, the proposed generator network with different conditional inputs outperforms C-VGAN and C-TGAN by a wide margin in both generation scenarios. Ours refers to models based on variations of the proposed embodiments.

TABLE 2

Quantitative Evaluation. Comparison of HOI-GAN with C-VGAN, C-TGAN, and MoCoGAN baselines. We distinguish training of HOI-GAN with bounding boxes (bboxes) and segmentation masks (masks).

| | EPIC | | | | | | SS | | | | | |
|---|---|---|---|---|---|---|---|---|---|---|---|---|
| | GS1 | | | GS2 | | | GS1 | | | GS2 | | |
| Model | I↑ | S↓ | D↑ | I↑ | S↓ | D↑ | I↑ | S↓ | D↑ | I↑ | S↓ | D↑ |
| C-VGAN [68] | 1.8 | 30.9 | 0.2 | 1.4 | 44.9 | 0.3 | 2.1 | 25.4 | 0.4 | 1.8 | 40.5 | 0.3 |
| C-TGAN [58] | 2.0 | 30.4 | 0.6 | 1.5 | 35.9 | 0.4 | 2.2 | 28.9 | 0.6 | 1.6 | 39.7 | 0.5 |
| MoCoGAN [66] | 2.4 | 30.7 | 0.5 | 2.2 | 31.4 | 1.2 | 2.8 | 17.5 | 1.0 | 2.4 | 33.7 | 1.4 |
| (ours) HOI-GAN (bboxes) | 6.0 | 14.0 | 3.4 | 5.7 | 20.8 | 4.0 | 6.6 | 12.7 | 3.5 | 6.0 | 15.2 | 2.9 |
| HOI-GAN (masks) | 6.2 | 13.2 | 3.7 | 5.2 | 18.3 | 3.5 | 8.6 | 11.4 | 4.4 | 7.1 | 14.7 | 4.0 |

Arrows indicate whether lower (↓) or higher (↑) is better.
[I: inception score; S: saliency score; D: diversity score]

In addition, the overall proposed model shows considerable improvement over MoCoGAN, while MoCoGAN has comparable scores to some ablated versions of the proposed models (specifically where gradient discriminator and/or relational discriminator is missing).

Furthermore, Applicants varied the richness of the masks in the conditional input context frame ranging from bounding boxes to segmentation masks obtained corresponding to non-person classes using MaskRCNN framework. As such, the usage of segmentation masks implies explicit shape information as opposed to the usage of bounding boxes where the shape information needs to be learnt by the model. Applicants observe that providing masks during training leads to slight improvements in both scenarios as compared to using bounding boxes (refer to Table 2).

Figure 7:
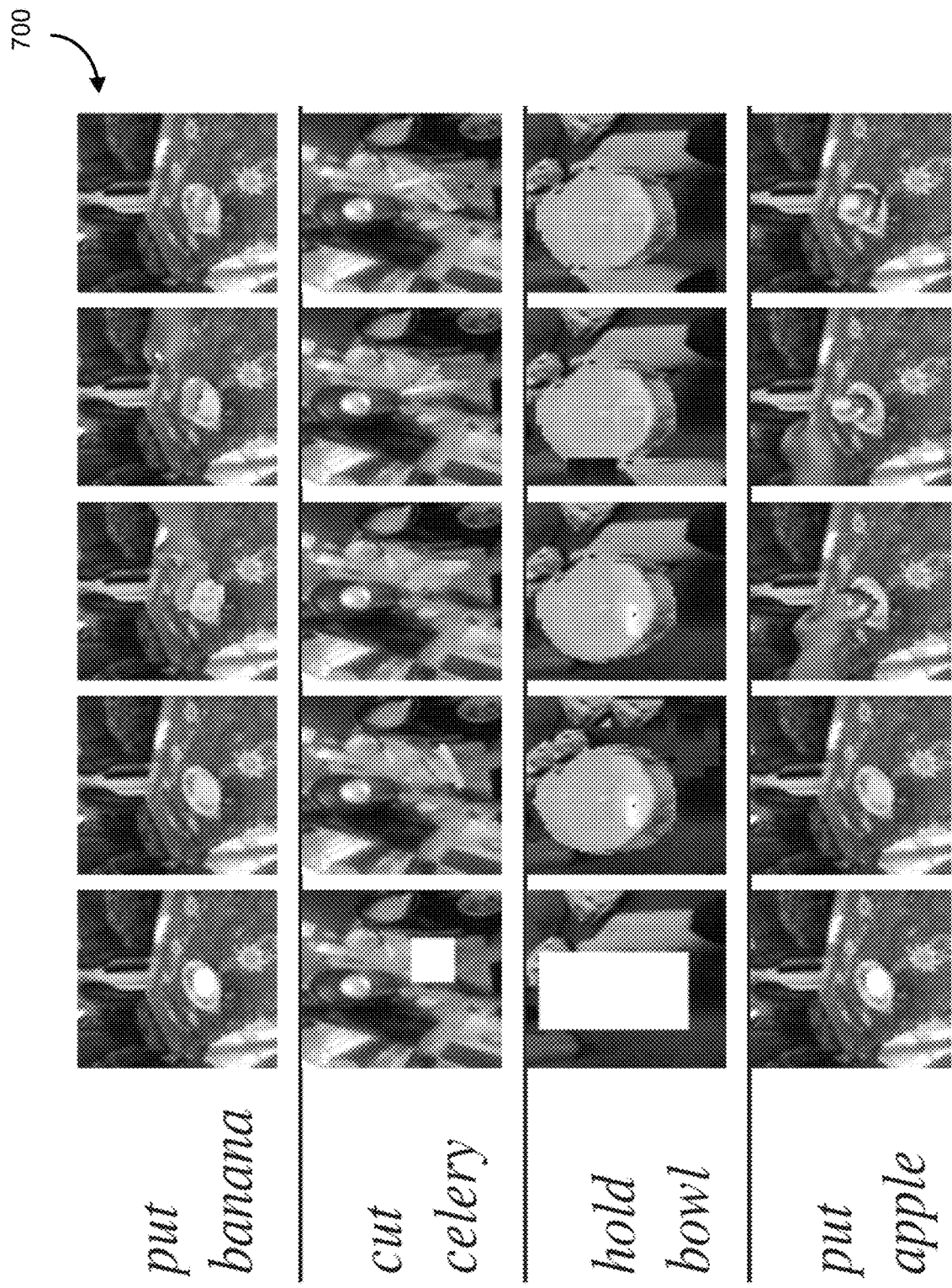
FIG. 7 are generated renderings of composite data objects (in this case, videos) based on unseen compositions, according to some embodiments.

Applicants also show the samples generated using the best version of the generator network for the two generation scenarios (FIG. 7).

FIG. 7 shows screen captures 700 of videos generated using the best version of HOI-GAN using embeddings for action (a)-object (o) composition and the context frame. Applicants show 5 frames of the video clip generated for both generation scenarios GS1 and GS2. The context frame in GS1 is obtained from a video in the test set depicting an action object composition same as the target one. The context frame for GS2 scenarios shown here are from videos depicting \take carrot" (for row 3) and \put bowl" (for row 4).

Conditional VideoGAN. VideoGAN involves two stream generator involving generation of foreground and background separately. Applicants develop the conditional variant of the VGAN model from the descriptions in the paper. Specifically, the approach provides semantic embeddings as the inputs and encoded images as the inputs to the generator and the semantic embeddings as the inputs to the last fully-connected layer of the discriminator. The conditional variant of the VideoGAN model is referred to as C-VGAN hereafter.

Conditional TemporalGAN. TemporalGAN uses a temporal generator involving 1D convolutions along the depth of the input to produce n latent variables from the input noise.

These latent variables are provided inputs to n independent generator to generate each of the n frames in a video. The conditional variant is developed of the TGAN as described in various embodiments. Specifically, the approach provides semantic embeddings and context image (encoded) as inputs to the temporal and image generators and the semantic embeddings as the inputs to the last fully-connected layer of the discriminator. The conditional variant of TemporalGAN is referred to as C-TGAN hereafter.

Implementation Details Networks G, D, $D_f$, $D_g$, $D_{fg}$ are implemented with convolutional layers of kernel size 4 and stride 2. To optimize the networks, an approach uses Adam optimizer with learning rate 0.0002 with $\beta_1$=0:9 and $\beta_2$=0: 999. A batch size of 64 is maintained while training our model and baselines (C-VGAN abd C-TGAN).

Quantitative Results

Comparison with Baselines

Applicants compare with baselines as described above in both generation scenarios (shown in Table 1 and 2).

Including Unlabeled Data

A weaker zero-shot is performed in semi-supervised setting where the model is fed the full dataset with the categories in the testing set are not given any labels or embedding. Refer Table 1 and 2.

Labels vs Embeddings

Applicants argue that the embeddings provide auxiliary information about the label categories. To verify this arguments, Applicants compare the model outputs of labels with categories, and refers to the results of Table 1 and 2.

Qualitative Results

Figure 8:
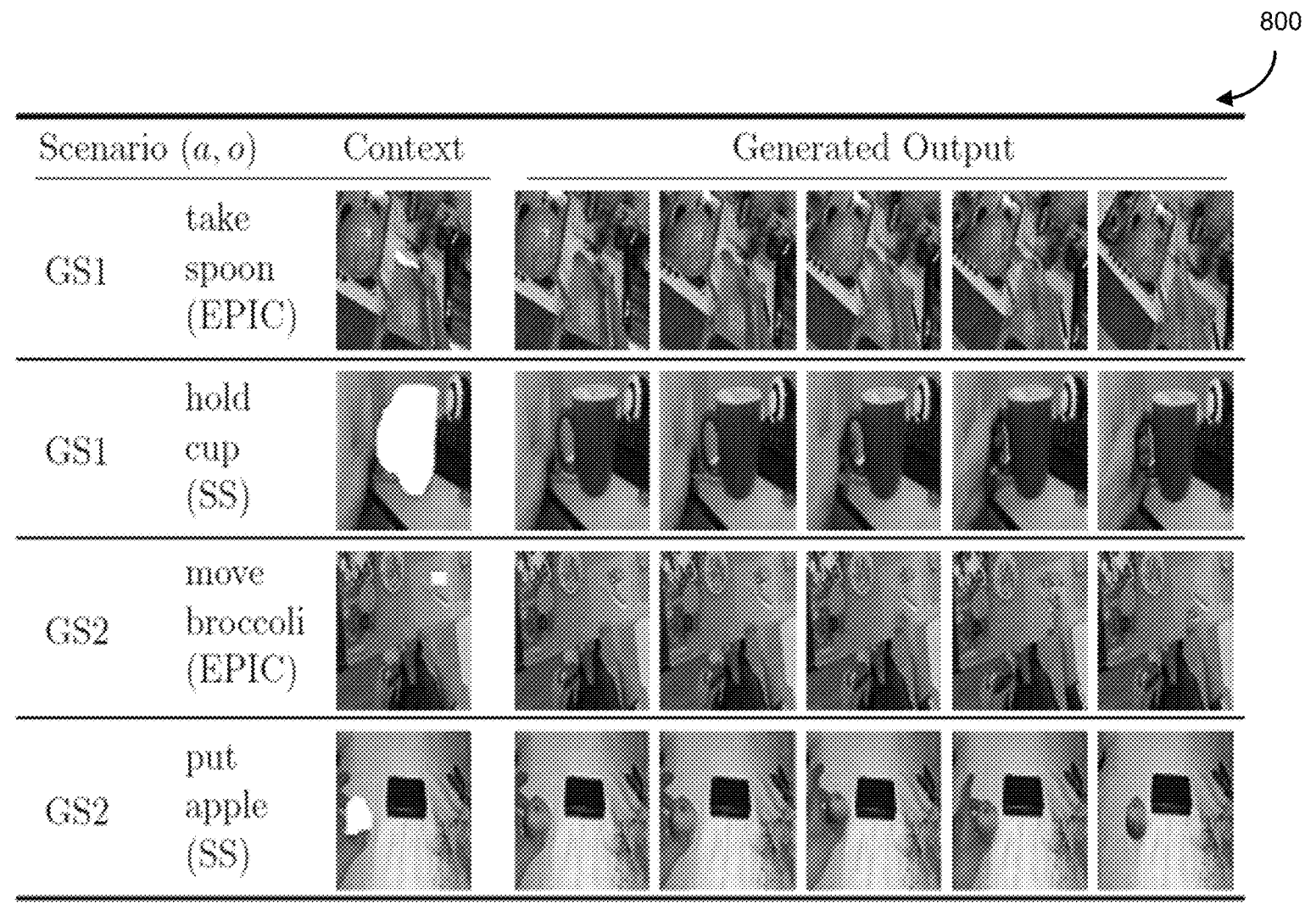

Qualitative results of experiments are provided in FIG. 8. FIG. 8 are generated versions 800 of composite data objects (in this case, videos) based on unseen compositions, according to some embodiments.

As shown in FIG. 8, unseen compositions are based on category combinations where the training data may have observed data objects based off of each of the categories individually, or off of similar categories. In this example, the computer system is tasked with generating composite's based off of the compositions put banana celery, hold bowl, and put apple. As shown in these illustrative examples, the system takes aspects of the underlying training data objects and combines them together to form new generated videos. However, as there may be gaps in observations, the system adapts by transforming or otherwise manipulating the underlying data objects in an attempt to create realistic looking composite data objects. FIG. 8 shows that this is problem is challenging for computer systems.

As described herein, various embodiments are proposed in relation to systems and methods for generating composite objects, including, for example, zero-shot HOI videos.

Specifically, the problem of generating video corresponding to unseen compositions of action and object having seen the action and object independently is evaluated. In various embodiments, there is proposed a DC-GAN based multi-adversarial model. An example evaluation is evaluated using subjective and objective measures and demonstrated that some embodiments of the approach perform better than baselines.

Ablation Study. To illustrate the impact of each discriminator in generating HOI videos, Applicants conducted ablation experiments (refer to Table 3). Applicant observe that the addition of temporal information using the gradient discriminator and spatio-temporal information using the video discriminator lead to improvement in generation quality.

Figure 9:
FIG. 9 is an example set of output frames of videos generated by example proposed systems depicting failed attempts, according to some embodiments.

In particular, the addition of our scene graph based relational discriminator leads to considerable improvement in generation quality resulting in more realistic videos (refer to second block in Table 3).

ventional colors for a microwave, it shows limited capability to hallucinate such large objects. For "cut peach" (FIG. 9), the generated sample shows that the model can learn the increase in count of partial objects corresponding to the action cut and yellow-green color of a peach.

However, as the model has not observed the interior of a peach during training (as cut peach was not in training set), it is unable to create realistic transformations in the state of peach that show the interior clearly. Accordingly, in some embodiments, Applicants suggest that using external knowledge and semi-supervised data in conjunction with the models described herein can potentially lead to more powerful generative models while still adhering to the zero-shot compositional setting.

TABLE 3

Ablation Study. We evaluate the contributions of our pixel-centric losses (F, G, V) and relational losses (first|block vs. second block) by conducting ablation study on HOI-GAN (masks). The last row corresponds to the overall proposed model.

|   | Model | EPIC GS1 | | | EPIC GS2 | | | SS GS1 | | | SS GS2 | | |
|---|---|---|---|---|---|---|---|---|---|---|---|---|---|
|   |   | I↑ | S↓ | D↑ | I↑ | S↓ | D↑ | I↑ | S↓ | D↑ | I↑ | S↓ | D↑ |
| −R | HOI-GAN (F) | 1.4 | 44.2 | 0.2 | 1.1 | 47.2 | 0.3 | 1.8 | 34.7 | 0.4 | 1.5 | 39.5 | 0.3 |
|    | HOI-GAN (F + G) | 2.3 | 25.6 | 0.7 | 1.9 | 30.7 | 0.5 | 3.0 | 24.5 | 0.9 | 2.7 | 28.8 | 0.7 |
|    | HOI-GAN (F + G + V) | 2.8 | 21.2 | 1.3 | 2.6 | 29.7 | 1.7 | 3.3 | 18.6 | 1.2 | 3.0 | 20.7 | 1.0 |
| +R | HOI-GAN (F) | 2.4 | 24.9 | 0.8 | 2.2 | 26.0 | 0.7 | 3.1 | 20.3 | 1.0 | 2.9 | 27.7 | 0.9 |
|    | HOI-GAN (F + G) | 5.9 | 15.4 | 3.5 | 4.8 | 21.3 | 3.3 | 7.4 | 12.1 | 3.5 | 5.4 | 19.2 | 3.4 |
|    | HOI-GAN (F + G + V) | 6.2 | 13.2 | 3.7 | 5.2 | 18.3 | 3.5 | 8.6 | 11.4 | 4.4 | 7.1 | 14.7 | 4.0 |

[F: frame discriminator $D_f$; G: gradient discriminator $D_g$; V: video discriminator $D_v$; R: relational discriminator $D_r$]

Human Evaluation: Applicants recruited 15 sequestered participants for a user study. Applicants randomly chose 50 unique categories and chose generated videos for half of them from generation scenario GS1 and the other half from GS2. For each category, Applicants provided three instances, each containing a pair of videos; one generated using a baseline model and the other using HOI-GAN. For each instance, at least 3 participants (ensuring inter-rater reliability) were asked to choose the video that best depicts the given category. The (aggregate) human preference scores for the proposed model versus the baselines range between 69-84% for both generation scenarios (refer Table 4) indicate that HOI-GAN generates more realistic videos than the baselines.

TABLE 4

Human Evaluation. Human Preference Score (%) for scenarios GS1 and GS2. All the results have p-value less than 005 implying statistical significance.

| Ours/Baseline | GS1 | GS2 |
|---|---|---|
| HOI-GAN/MoCoGAN | 71.7/28.3 | 69.2/30.8 |
| HOI-GAN/C-TGAN | 75.4/34.9 | 79.3/30.7 |
| HOI-GAN/C-VGAN | 83.6/16.4 | 80.4/19.6 |

Failure Cases: Applicants discuss the limitations of the framework using qualitative examples shown in the screenshots 900 of FIG. 9. For "open microwave", Applicants observe that although HOI-GAN is able to generate con- Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A computer implemented system for generating one or more data structures, the one or more data structures representing an unseen composition based on a first category and a second category observed individually, the system comprising:
one or more processors operating in conjunction with computer memory, the one or more processors configured to provide:
a data receiver interface configured to receive a training data set including labelled data elements based on the first category and labelled data elements based on the second category and to receive a target category indication representative of the unseen composition;
a conditional generative adversarial network configured to process the training data set to train a discriminator model architecture coupled to a generator model architecture, the discriminator model architecture having a plurality of adversarial networks operating in concert to train the generator model architecture, the discriminator model architecture including at least:
a sequence discriminator configured to distinguish between a real sequence and a generated sequence;
a frame discriminator configured to differentiate between frames representing sequence subsets of the real sequence and the generated sequence;
a gradient discriminator configured to differentiate between a domain-specific gradient determined based on the type of data structure of the one or more data structures and the training data set; and
a relational discriminator configured to assign weights for shifting focus of the generator model architecture to a subset of the one or more new data structures based on an identified context associated with the target category indication of the unseen composition;
wherein the generator model architecture is configured to generate the one or more data structures representing the unseen composition based on the outputs of the plurality of adversarial networks.

2. The system of claim 1, wherein the first category includes a set of actions, the second category includes a set of objects, and the training data set includes a plurality of data structures of action/object pairs different than the target category indication representative of the unseen composition.

3. The system of claim 2, wherein the new data structures includes at least a new video data structure generated to represent an action/object pair representative of the unseen composition by synthesizing independently observed data represented in the training data set.

4. The system of claim 1, wherein the first category includes vectorized transactional information and wherein the second category includes vectorized representation of one or more events.

5. The system of claim 1, wherein vectorized labels associated with each training data element in the training data set are processed to identify one or more contextual components that are used for comparison with a vector representing the unseen composition, the one or more contextual components utilized for modifying the operation of the discriminator model architecture.

6. The system of claim 1, wherein the sequence discriminator utilizes a loss function having the relation:

$$L_v = \frac{1}{2}[\log(D_v(V_{real}, s_a, s_o)) + \log(1 - D_v(V_{gen}, s_a, s_o))].$$

7. The system of claim 1, wherein the frame discriminator utilizes a loss function having the relation:

$$L_f = \frac{1}{2T}\sum_{i=1}^{T} [\log(D_f^i(V_{real}, s_a, s_o)) + \log(1 - D_f^i(V_{gen}, s_a, s_o))].$$

8. The system of claim 1, wherein the gradient discriminator utilizes a loss function having the relation:

$$L_g = \frac{1}{2(T-1)}\sum_{i=1}^{T-1} [\log(D_g^i(\delta V_{real}, s_a, s_o)) + \log(1 - D_g^i(\delta V_{gen}, s_a, s_o))].$$

9. The system of claim 1, wherein the relational discriminator utilizes a loss function having the relation:

$$L_{fg} = \frac{1}{2T}\sum_{i=1}^{T} [\log(D_{fg}^i(F_{real}, s_a, s_o)) + \log(1 - D_{fg}^i(F_{gen}, s_a, s_o))].$$

10. The system of claim 1, wherein the generator model architecture is configured to be optimized using an objective function having the relation:

$$\mathcal{L}_{gan} = \log(1 - D_v(V_{gen}, s_a, s_o)) + \frac{1}{T}\sum_{i=1}^{T} [\log(1 - D_f^i(V_{gen}, s_a, s_o))] + \frac{1}{(T-1)}\sum_{i=1}^{T-1} [\log(1 - D_g^i(\delta V_{gen}, s_a, s_o))] + \frac{1}{T}\sum_{i=1}^{T} [\log(1 - D_{fg}^i(F_{gen}, s_a, s_o))].$$

11. A computer implemented method for generating one or more data structures using a conditional generative adversarial network, the one or more data structures representing an unseen composition based on a first category and a second category observed individually, the method comprising:
receiving a training data set including labelled data elements based on the first category and labelled data elements based on the second category;
receiving a target category indication representative of the unseen composition;
processing the training data set to train a discriminator model architecture coupled to a generator model architecture, the discriminator model architecture including at least:
a relational discriminator $D_r$ configured to assign weights for shifting focus of the generator model architecture to a subset of the one or more new data structures based on an identified context associated with the target category indication of the unseen composition; and
generating using the generator model architecture the one or more data structures;
wherein the relational discriminator utilizes a spatio-temporal scene graph, and adapts a neural network to distinguish between element layouts of real data objects $V_{real}$ and generated data objects $V_{gen}$;

wherein the spatio-temporal scene graph is represented as $S = (\mathcal{N}, \varepsilon)$ and generated from V, where the nodes and edges are represented by $\mathcal{N}$ and $\varepsilon$.

12. The method of claim 11, wherein the relational discriminator operates on scene graph $S$ using a graph convolutional network (GCN) followed by stacking and average-pooling of the resulting node representations along the time axis.

13. The method of claim 12, wherein the scene graph is the concatenated with spatially replicated copies of $s_a$ and $s_o$ to generate a tensor of size $(\dim(s_a)+\dim(s_o)+N^{(t)}) \times w_0^{(t)} \times h_0^{(t)}$, wherein $s_a$ and $s_o$ represent word embeddings of two different characteristics.

14. The method of claim 13, the method further comprising applying convolutions and sigmoid to the tensor of size $(\dim(s_a)+\dim(s_o)+N^{(t)}) \times w_0^{(t)} \times h_0^{(t)}$ to obtain an intermediate output which denotes the probability of the scene graph belonging to a real data object, the intermediate output used to assign the weights for shifting focus of the generator model architecture.

15. The method of claim 11, wherein an objective function of the relational discriminator is given by:

$$L_r = \frac{1}{2}[\log(D_r(S_{real}; s_a, s_o)) + \log(1 - D_r(S_{gen}; s_a, s_o))].$$

16. The method of claim 11, wherein the discriminator model architecture further includes a sequence discriminator configured to distinguish between a real sequence and a generated sequence.

17. The method of claim 16, wherein the discriminator model architecture further includes a gradient discriminator configured to differentiate between a domain-specific gradient determined based on the type of data structure of the one or more data structures and the training data set.

18. The method of claim 17, wherein the discriminator model architecture further includes a frame discriminator configured to differentiate between frames representing sequence subsets of the real sequence and the generated sequence.

19. The method of claim 18, wherein the relational discriminator, the sequence discriminator, the gradient discriminator, and the frame discriminator are trained simultaneously.

20. A non-transitory, computer readable medium, storing machine interpretable instructions, which when executed by a processor, cause the processor to perform a computer implemented method of generating one or more data structures using a conditional generative adversarial network, the one or more data structures representing an unseen composition based on a first category and a second category observed individually, the method comprising:
receiving a training data set including labelled data elements based on the first category and labelled data elements based on the second category;
receiving a target category indication representative of the unseen composition;
processing the training data set to train a discriminator model architecture coupled to a generator model architecture, the discriminator model architecture having a plurality of adversarial networks operating in concert to train the generator model architecture, the discriminator model architecture including at least:
a relational discriminator configured to assign weights for shifting focus of the generator model architecture to a subset of the one or more new data structures based on an identified context associated with the target category indication of the unseen composition; and
generating, using the generator model architecture, the one or more data structures;
wherein the relational discriminator utilizes a spatio-temporal scene graph, and learns to distinguish between element layouts of real element objects $V_{real}$ and generated data elements $V_{gen}$;
wherein the spatio-temporal scene graph is represented as $S = (\mathcal{N}, \varepsilon)$ and generated from V, where the nodes and edges are represented by $\mathcal{N}$ and $\varepsilon$.

* * * * *